United States Patent
Chang et al.

(10) Patent No.: US 10,904,334 B1
(45) Date of Patent: Jan. 26, 2021

(54) CLOUD DATA STORAGE VIA CASCADED K-MUXING

(71) Applicant: SPATIAL DIGITAL SYSTEMS, INC., Agoura Hills, CA (US)

(72) Inventors: Donald C. D. Chang, Thousand Oaks, CA (US); Juo-Yu Lee, Westlake Village, CA (US)

(73) Assignee: SPATIAL DIGITAL SYSTEMS, INC., Agoura Hills, CA (US)

(*) Notice: Subject to any disclaimer, the term of this patent is extended or adjusted under 35 U.S.C. 154(b) by 0 days.

(21) Appl. No.: 15/873,892

(22) Filed: Jan. 17, 2018

Related U.S. Application Data

(60) Provisional application No. 62/447,369, filed on Jan. 17, 2017.

(51) Int. Cl.
*H04L 29/08* (2006.01)
*G06F 3/06* (2006.01)

(52) U.S. Cl.
CPC .......... *H04L 67/1097* (2013.01); *G06F 3/067* (2013.01); *G06F 3/0622* (2013.01); *G06F 3/0659* (2013.01); *H04L 69/324* (2013.01)

(58) Field of Classification Search
CPC . H04L 67/1097; H04L 69/324; G06F 3/0622; G06F 3/0659; G06F 3/067; G06F 3/062
See application file for complete search history.

(56) References Cited

U.S. PATENT DOCUMENTS

| | | | | |
|---|---|---|---|---|
| 8,098,612 B2 * | 1/2012 | Chang | ................ | H04B 7/2041 370/316 |
| 8,111,646 B1 * | 2/2012 | Chang | ................ | H04B 7/0413 370/316 |
| 9,848,094 B2 * | 12/2017 | Chang | ................ | H04N 1/00307 |
| 10,079,886 B2 * | 9/2018 | Chang | ................ | G06F 16/24568 |
| 2004/0228370 A1 * | 11/2004 | Riesenman | ......... | G06F 13/4027 370/537 |
| 2007/0195831 A1 * | 8/2007 | Tanaka | ............ | G01R 31/31723 370/537 |

(Continued)

OTHER PUBLICATIONS

Wikipedia "Wave" Aug. 23 2019.*

(Continued)

*Primary Examiner* — Mark H Rinehart
*Assistant Examiner* — Kenneth P Hunt
(74) *Attorney, Agent, or Firm* — Phuong-Quan Hoang

(57) ABSTRACT

For data writing, a first input device performs a first wavefront multiplexing transform on a first input stream and a first probing stream to generate L first intermediate streams. An en-route processing device generates J output streams from the stored L first intermediate streams and at least a second probing stream. For data reading, an en-route processing device generates L first intermediate streams and at least a first recovered probing stream from J input streams including a first stored probing stream. The L first intermediate streams are stored in a first storage site. A first output device performs a first wavefront demultiplexing transform on the L first intermediate streams to generate a first output stream and a second recovered probing stream. The J input streams are stored in a distributed storage structure having at least a second storage site that stores P of the J input streams.

20 Claims, 19 Drawing Sheets

(56) References Cited

U.S. PATENT DOCUMENTS

| | | | | |
|---|---|---|---|---|
| 2008/0148214 A1* | 6/2008 | Yancey | G06F 17/5054 | 716/103 |
| 2011/0197740 A1* | 8/2011 | Chang | G10H 1/361 | 84/610 |
| 2011/0289351 A1* | 11/2011 | Rashmi | G06F 11/1662 | 714/6.32 |
| 2013/0321206 A1* | 12/2013 | Chang | H01Q 3/34 | 342/372 |
| 2013/0333544 A1* | 12/2013 | Chang | G10H 1/361 | 84/610 |
| 2014/0081989 A1* | 3/2014 | Chang | G06F 11/2058 | 707/748 |
| 2014/0161018 A1* | 6/2014 | Chang | H04B 7/0452 | 370/312 |
| 2014/0317222 A1* | 10/2014 | Li | H04L 67/1097 | 709/213 |
| 2015/0009892 A1* | 1/2015 | Chang | H04B 7/0452 | 370/328 |
| 2015/0032706 A1* | 1/2015 | Chang | H04N 1/00244 | 707/693 |
| 2015/0040184 A1* | 2/2015 | Chang | G06F 21/6245 | 726/1 |
| 2015/0248431 A1* | 9/2015 | Lee | G06F 16/1744 | 707/693 |
| 2016/0048371 A1* | 2/2016 | Chang | G06F 16/64 | 700/94 |
| 2016/0048697 A1* | 2/2016 | Chang | G06F 21/6209 | 726/26 |
| 2016/0048701 A1* | 2/2016 | Chang | G06F 16/13 | 726/28 |
| 2017/0264317 A1* | 9/2017 | Datta | H03M 13/3761 | |
| 2018/0109689 A1* | 4/2018 | Chang | H04N 1/00307 | |
| 2018/0205448 A1* | 7/2018 | Chang | H04B 7/18526 | |
| 2018/0205583 A1* | 7/2018 | Chang | H04B 7/2041 | |
| 2018/0302150 A1* | 10/2018 | Chang | G01S 13/9303 | |
| 2019/0020397 A1* | 1/2019 | Chang | H04B 7/0413 | |
| 2019/0020403 A1* | 1/2019 | Chang | H04B 7/18504 | |
| 2019/0034108 A1* | 1/2019 | Chang | G06F 3/0638 | |
| 2019/0044582 A1* | 2/2019 | Chang | H04B 7/0413 | |
| 2019/0108178 A1* | 4/2019 | Chang | G06F 11/2058 | |
| 2019/0266340 A1* | 8/2019 | Chang | G06F 21/6209 | |

OTHER PUBLICATIONS

Wikipedia "Wavefront" Jun. 20 2019.*

D. Chang, J. Lee, H. Yeh, F. Lu, S. K. Chen and K. Yao, "Secured data storage on cloud systems via wavefront multiplexing," 2013 IEEE Globecom Workshops (GC Wkshps), Atlanta, GA, 2013, pp. 494-499. http://ieeexplore.ieee.org/stamp/stamp.jsp?tp=&arnumber=6825036&isnumber=6824917.*

D. C. D. Chang, H. Yeh and Yulan Sun, "Orthogonal wavefront-multiplexing architecture for communications in non-contiguous channels," 2013 Wireless Telecommunications Symposium (WTS), Phoenix, AZ, 2013, pp. 1-10. http://ieeexplore.ieee.org/stamp/stamp.jsp?tp=&arnumber=6566242&isnumber=6566222.*

A. G. Dimakis, P. B. Godfrey, Y. Wu, M. J. Wainwright and K. Ramchandran, "Network Coding for Distributed Storage Systems," in IEEE Transactions on Information Theory, vol. 56, No. 9, pp. 4539-4551, Sep. 2010 http://ieeexplore.ieee.org/stamp/stamp.jsp?tp=&arnumber=5550492&isnumber=5550275.*

T. K. Dikaliotis, A. G. Dimakis and T. Ho, "Security in distributed storage systems by communicating a logarithmic number of bits," 2010 IEEE International Symposium on Information Theory, Austin, TX, 2010, pp. 1948-1952. http://ieeexplore.ieee.org/stamp/stamp.jsp?tp=&arnumber=5513354&isnumber=5513230.*

B. Chen, G. Ateniese, "Remote Data Checking for Network Coding-based Distributed Storage Systems" Oct. 8, 2010 Proceedings of the 2010 ACM workshop on Cloud computing security workshop pp. 31-42 https://web.njit.edu/~crix/publications/acm-ccsw10.pdf.*

* cited by examiner

CLOUD DATA STORAGE VIA CASCADED K-MUXING

RELATED APPLICATIONS

This application claims priority from Provisional Patent Application No. 62/447,369, filed on Jan. 17, 2017. This application is related to U.S. Pat. No. 8,098,612 issued on Jan. 17, 2012, entitled "APPARATUS AND METHOD FOR REMOTE BEAM FORMING FOR SATELLITE BROADCASTING SYSTEMS," U.S. Pat. No. 8,111,646 issued on Feb. 7, 2012, entitled "COMMUNICATION SYSTEM FOR DYNAMICALLY COMBINING POWER FROM A PLURALITY OF PROPAGATION CHANNELS IN ORDER TO IMPROVE POWER LEVELS OF TRANSMITTED SIGNALS WITHOUT AFFECTING RECEIVER AND PROPAGATION SEGMENTS," U.S. patent application Ser. No. 14/712,145, filed on May 14, 2015, entitled "SURVIVABLE CLOUD DATA STORAGE AND TRANSPORT," and U.S. patent application Ser. No. 14/512,959, filed on Oct. 13, 2014, entitled "Enveloping for Cloud Computing via Wavefront Muxing," which are expressly incorporated by reference herein in their entireties.

TECHNICAL FIELD

One disclosed aspect of the embodiments is directed to the field of data storage and recovery. In particular, the embodiment is directed to data storage and recovery using wavefront multiplexing (WFM) technology.

BACKGROUND

Long before the beginning of digital age, people had manually stored data while the 'data storage' from time to time might suffer loss due to lack of availability and privacy protection. With the advancement of digital technology, data storage has been an indispensable function in many aspects of modern era. The need for availability and privacy protection remains central to evolving data storage design.

Data not only resides in storage but also appears in transition among communication terminals and users. To provide quality of service and quality of experience, it is also of significant value to transport data that is highly available and securely protected. The service of data transport should meet requirements of availability and privacy protection to satisfy user's demand for quality and experience.

Repetition coding is one approach to providing availability against the event of data loss. One application of repetition code is RAID (redundant array of independent disks). Among variations of RAID, RAID 1 creates one redundant piece of a data stream. For one data stream, RAID thus creates two identical copies to be stored. The space overhead of RAID 1 is 50%, which is high in state-of-the-art storage, and it bears low level privacy protection if no encoding or other measure is further applied to the stored copy.

Wavefront multiplexing (WF muxing, or K-muxing) and wavefront demultiplexing (WF demuxing or K-demuxing) are multi-dimension data processing methods. Both K-muxing and K-demuxing define transformation of multi-dimensional signals or data streams that feature particular distribution patterns (or 'wavefronts') in K-space. K-muxing and K-demuxing enable redundancy to enhance availability and provide scrambled signals or data streams designed toward privacy protection.

SUMMARY

One disclosed aspect of the embodiments is a method and apparatus to provide data storage and recovery using cascaded wavefront multiplexing (WFM) technique. For data writing, a first input device performs a first WFM transform on a first input stream and a first probing stream to generate L first intermediate streams. The L first intermediate streams are stored in a first storage site. An en-route processing device generates J output streams from the stored L first intermediate streams and at least a second probing stream. The J output streams are stored in a distributed storage structure having at least a second storage site that stores P of the J output streams. P is selected to disable a recovery of the first input stream based on the stored P of the J output streams. J, L, and P are positive integers greater than 1, J>L and J>P.

For data reading, an en-route processing device generates L first intermediate streams and at least a first recovered probing stream from J input streams including a first stored probing stream. A first output device performs a first wavefront demultiplexing transform on the L first intermediate streams to generate a first output stream and a second recovered probing stream. The L first intermediate streams are stored in a first storage site. For both writing and reading, the J output (for writing) or input (for reading) streams are stored in a distributed storage structure having at least a second storage site that stores P of the J output/input streams. P is selected to disable a recovery of the first input/output stream based on the stored P of the J output/input streams. J, L, and P are positive integers greater than 1, J>L and J>P. The J input streams are stored in a distributed storage structure having at least a second storage site that stores P of the J input streams. P is selected to disable a recovery of the first output stream based on the stored P of the J input streams. J, L, and P are positive integers greater than 1, J>L and J>P.

BRIEF DESCRIPTION OF THE DRAWINGS

Embodiments may best be understood by referring to the following description and accompanying drawings that are used to illustrate embodiments. In the drawings.

DETAILED DESCRIPTION

Figure 1:
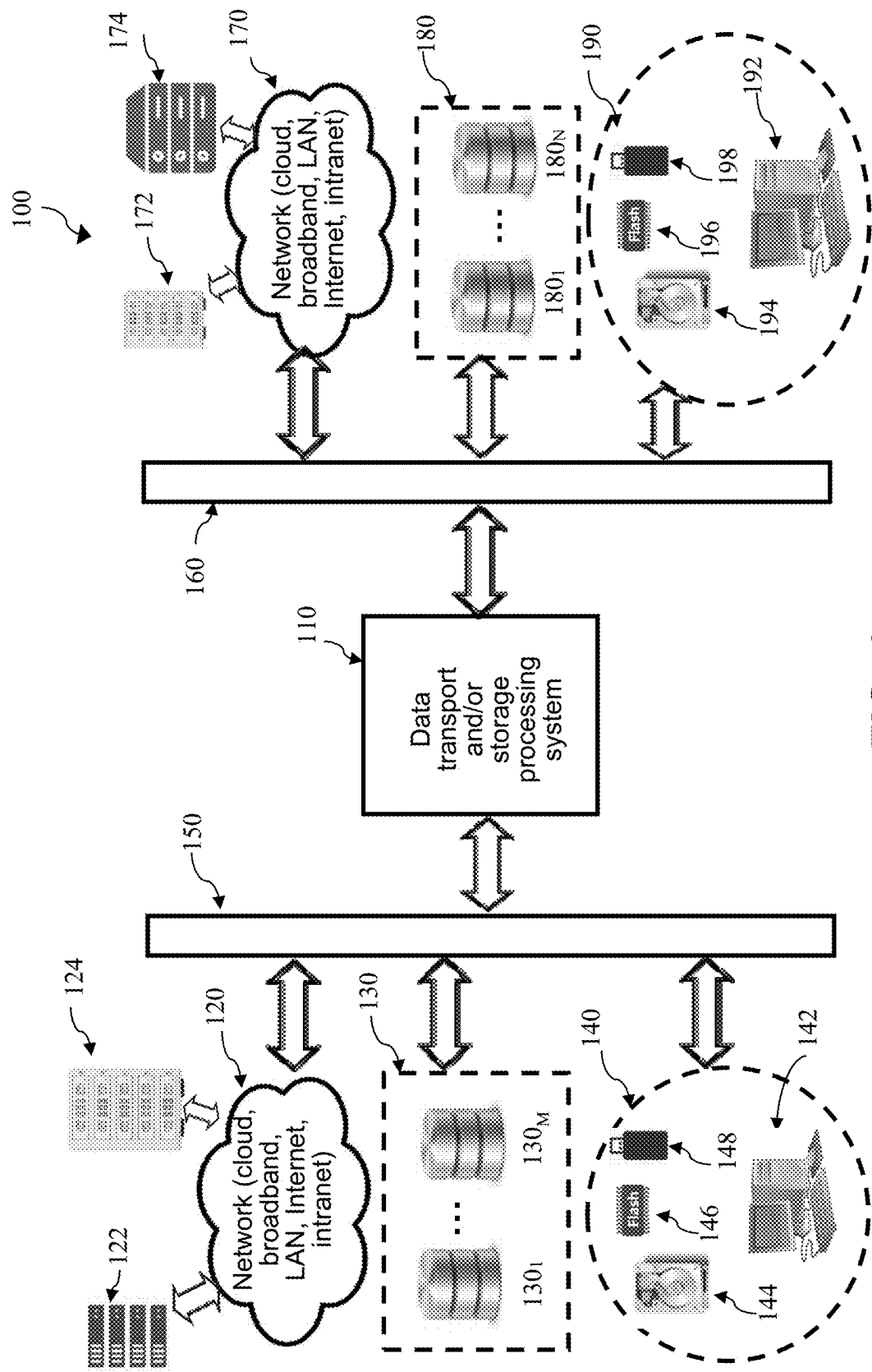
FIG. 1 is a diagram illustrating a system using a data transport and/or storage processing system according to one embodiment.

One disclosed aspect of the embodiments is a method and apparatus to provide data storage and recovery using cascaded wavefront multiplexing (WFM) technique. The technique allows writing data to or reading data from storage devices in a distributed manner to enhance fault tolerance, reliability, and availability.

For data writing, a first input device performs a first WFM transform on a first input stream and a first probing stream to generate L first intermediate streams. The L first intermediate streams are stored in a first storage site. An en-route processing device generates J output streams from the stored L first intermediate streams and at least a second probing stream. The J output streams are stored in a distributed storage structure having at least a second storage site that stores P of the J output streams. P is selected to disable a recovery of the first input stream based on the stored P of the J output streams. J, L, and P are positive integers greater than 1, J>L and J>P.

For data reading, an en-route processing device generates L first intermediate streams and at least a first recovered probing stream from J input streams including a first stored probing stream. A first output device performs a first wavefront demultiplexing (WFD) transform on the L first intermediate streams to generate a first output stream and a second recovered probing stream. The L first intermediate streams are stored in a first storage site. The J input streams are stored in a distributed storage structure having at least a second storage site that stores P of the J input streams. P is selected to disable a recovery of the first output stream based on the stored P of the J input streams. J, L, and P are positive integers greater than 1, J>L and J>P.

At least one of the first, second, and third storage sites includes at least one of a network attached storage (NAS) device, a direct access storage (DAS) device, a storage area network (SAN) device, redundant array of independent disks (RAIDs), a cloud storage, a hard disk, a solid-state memory device, and a device capable of storing data.

In the following description, numerous specific details are set forth. However, it is understood that embodiments may be practiced without these specific details. In other instances, well-known circuits, structures, and techniques have not been shown to avoid obscuring the understanding of this description. One disclosed feature of the embodiments may be described as a process which is usually depicted as a flowchart, a flow diagram, a structure diagram, or a block diagram. One embodiment may be described by a schematic drawing depicting a physical structure. It is understood that the schematic drawing illustrates the basic concept and may not be scaled or depict the structure in exact proportions.

The term "writing" refers to the act of storing data on or transmitting or sending data through multiple physical and logical dimensions. The term "reading" refers to the act of retrieving data from or receiving data through multiple physical and logical dimensions. Physical dimensions may refer to computers, mobile devices, data centers and so on. Logical dimensions may refer to allocated or virtualized resources for data storage or data transport. Both physical and logical dimensions may also refer to communication channels in general.

One aspect of the embodiments relates to distributed data storages with built-in redundancy for a single stream data subdivided into multiple (M) data substreams or M independent data streams, converted into K-muxed domain with M+N output wavefront components (WFCs), and stored these M+N WFC output data as M+N separated data storage sets, where N, and M are non-negative integers. As a result, the stored data sets are WFCs in the format of linear combinations of the data sets, instead of the data sets themselves. The coefficients involved in K-muxing and K-demuxing may take complex values. Hence, the vector of coefficients involved in K-muxing and K-demuxing may include, but not limited to, column vectors in Hadamard transformation, Fourier transformation, etc. The matrix comprising coefficients involved in K-muxing and K-demuxing features subsets of M rows that have full rank in order to satisfy the redundancy requirements.

In general, the input ports of a K-muxing transform are referred to as "slices" and the output ports are referred to as "WFCs." For instance, the first and the third input ports to a 16-to-16 K-muxing transform are referred as the slice 1 and the slice 3, respectively. Similarly, the $13^{th}$ and the $16^{th}$ output ports are called the WFC 13 and the WFC 16, respectively. Collectively, the output data from a K-muxing transform also referred as the K-muxed data are outputted from all the WFC ports. A first input stream connected to slice 1 of the 16-to-16 K muxing transform shall appear in all the WFC ports with a unique wavefront called wavefront 1 indicated as wavefront vector 1 or WFV1 over a 16-dimensional space; each dimension representing an output from a unique WFC port. Similarly, a second input stream connected to slice 16 of the 16-to-16 K muxing transform shall also appear in all the WFC ports with another unique wavefront called wavefront 16 indicated as wavefront vector 16 or WFV16.

Existing redundancy-generation coding such as erasure code often appears as systematic code, which preserves original data streams in addition to computed parity data streams. The preserved original data streams should be protected, unless otherwise further processed by measures such as encryption. On the other hand, K-muxing renders each WFC unintelligible to protect every data stream to be stored or transported.

Assume, in a writing process, a data stream's M substreams ($S_1, S_2, \ldots, S_M$) are transformed into M+N WFCs ($D_1, D_2, \ldots, D_{M+N}$) via K-muxing. Each WFC $D_i$ can be further coded by a coding function that generates coded components (CCs) $R_{i,1}, R_{i,2}, R_{i,L}$ to be stored in or transported through multiple physical and logical dimensions. To 'read' the substreams ($S_1, S_2, \ldots, S_M$), the set of CCs $\{R_{i,1}, R_{i,2}, \ldots, R_{i,L}\}$ (or its subset) associated with $D_i$ can be used to first decode $D_i$ via a decoding function; and then a subset (with size no less than M) of the WFCs $\{D_1, D_2, \ldots, D_{M+N}\}$ can be used to reconstitute $S_1, S_2, \ldots, S_M$ via K-demuxing followed by the recovery of the original data stream. Hence, in the writing process, K-muxing can be performed, preceding the execution of the coding function. In the corresponding reading process, decoding takes place first, followed by K-demuxing.

Assume, in a writing process, a data stream is transformed by a K-muxer, generating WFCs $D_1, D_2, \ldots, D_{M+N}$. A coding function can be enabled to take all WFCs ($D_1, D_2, \ldots, D_{M+N}$) as input, generating CCs ($R_1, R_2, \ldots, R_L$), where L is an integer, as output to be stored in or transported through multiple physical and logical dimensions. In the corresponding reading process, a decoding function can be enabled to take the set of CCs $\{R_1, R_2, \ldots, R_L\}$ or its subset as input, recovering the set of WFCs $\{D_1, D_2, \ldots, D_{M+N}\}$ or its subset as output. A K-demuxer can then be enabled to take the set of WFCs $\{D_1, D_2, D_{M+N}\}$ or its subset as input and then reconstitute the original data stream.

One can also arrange the K-muxer and coding function as follows. Assume, in a writing process, a data stream is transformed by a K-muxer, generating WFCs $D_1, D_2, \ldots, D_{M+N}$. Several coding functions can be enabled in parallel, each of which takes one subset of the set $\{D_1, D_2, \ldots, D_{M+N}\}$ as input denoted by $\{D_{i,1}, D_{i,2}, \ldots, D_{i,Q}\}$, where Q is an integer, and generates a set of CCs $\{R_{i,1}, R_{i,2}, \ldots, R_{i,L}\}$ to be stored in and transported through multiple physical and logical dimensions. In the corresponding reading process, all or some decoding functions can be enabled, each of which can take one subset of some CC set $\{R_{i,1}, R_{i,2}, \ldots, R_{i,L}\}$ as input and generate a set of WFCs $\{D_{i,1}, D_{i,2}, \ldots, D_{i,Q}\}$ or its subset as output. A K-demuxer can then be enabled to take the set of WFCs $\{D_1, D_2, D_{M+N}\}$ or its subset (with size no less than M) as input and then reconstitute the original data stream.

The K-muxer and coding function can also be arranged in different orders. Assume, in a writing process, a data stream is encoded by a coding function, generating CCs $R_1, R_2, \ldots, R_M$. A K-muxer can be enabled to take all CCs ($R_1, R_2, \ldots, R_M$) as input, generating M+N WFCs ($D_1, D_2, \ldots, D_{M+N}$) as output to be stored in or transported through multiple physical and logical dimensions. In the corresponding reading process, a K-demuxer can be enabled to take a subset (with size no less than M) of the WFCs ($D_1, D_2, D_{M+N}$) as input, generating the set of CCs $\{R_1, R_2, \ldots, R_M\}$ or its subset as output. A decoding function can then be enabled to take the set of CCs $\{R_1, R_2, \ldots, R_M\}$ or its subset as input and then reconstitute the original data stream.

One can also arrange the K-muxer and coding function as follows. Assume, in a writing process, a data stream is encoded by a coding function, generating CCs $R_1, R_2, \ldots, R_L$. Several K-muxers can be enabled in parallel, each of which takes one subset of the set $\{R_1, R_2, \ldots, R_L\}$ as input denoted by $\{R_{i,1}, R_{i,2}, \ldots, R_{i,M}\}$ and generates a set of WFCs $\{D_{i,1}, D_{i,2}, \ldots, D_{i,(M+N)}\}$ to be stored in and transported through multiple physical and logical dimensions. In the corresponding reading process, all or some K-demuxers can be enabled, each of which can take one subset (with size no less than M) of some WFC set $\{D_{i,1}, D_{i,2}, \ldots, D_{i,(M+N)}\}$ as input and generate a set of CCs $\{R_{i,1}, R_{i,2}, \ldots, R_{i,M}\}$ or its subset as output. A decoding function can then be enabled to take the set of CCs $\{R_1, R_2, R_M\}$ or its subset as input and then reconstitute the original data stream.

K-muxers and K-demuxers can also be cascaded in designated order according to the requirements of resource allocation, as disclosed in this disclosure.

FIG. 1 is a diagram illustrating a system 100 using a data transport and/or storage processing system according to one embodiment. The system 100 includes a data transport and/or storage processing system 110, a source network 120, a source storage system 130, a source computer system 140, a destination network 170, a destination storage system 180, and a destination computer system 190. Note that the source device may be the same as the destination device. For example, the source network 120 may be the same as the destination network 170. The system 100 may contain more or less than the above components. The system 100 may function to transport data and write or transmit data to a storage system, such as the destination storage system 180. The system 100 may also function to transport data and read or receive data from a storage system, such as the source storage system 130. In addition, the system 100 may function to read or receive data from one end and to write or transmit data to another end, including both source devices and destination devices.

The data transport and/or storage processing system may receive or read a stream of data from the source network 120, the source storage system 130, or the source computer system 140. The data or stream of data may be an original stream of data or content that has not been processed by the processing system 110, or it may have already been processed by the processing system 110 and is now ready to be reconstituted to produce the original data or stream of data.

The source network 120 may be any type of network, wired or wireless, including broadband, local area network (LAN), the Internet, intranet, or cloud. The network 120 may connect to any device that have storage capability or produce content that may be transmitted. In one embodiment, the network 120 may be connected to storage devices 122 and 124. The storage devices 122 and 124 may be any one of a network attached storage (NAS) device, a direct access storage (DAS) device, or a storage area network (SAN) device. The NAS device may use any suitable data transmission methods, such as Transmission Control Protocol/Internet Protocol (TCP/IP), Ethernet. The DAS device may employ any of the interfaces such as small computer system interface (SCSI), serial attached SCSI (SAS), Advanced Technology Attachment (ATA), etc. The SAN device may use any suitable interface for data transmission such as Fiber Channel, IP.

The source storage system 130 may be a highly reliable storage system such as a group of redundant array of independent disks (RAIDs) $130_1, \ldots, 130_M$. The RAIDs 130 may be any type of RAIDs that provide data redundancy, fault tolerance, or performance improvement. Any suitable level may be configured. For example, RAID 0 provides striping that distributes contents of files among the disks, RAID 1 provides data mirroring in which data is written identically to two drives, thereby producing a "mirrored set" of drives.

The source computer system 140 may be any suitable computer system having storage capability, including a server, a desktop computer 142, a laptop computer, a mobile device such as panel computer or telephone, video or image capture device, etc. It may include storage devices such as hard disk 144, solid-state drive 146, or thumb drive 148.

The data from the source network 120, the source RAIDs 130, or the source computer system 140 are transferred to the processing system 110 via a bus or channel 150.

The processing system 110 processes the data and transmits, sends, writes, or stores the processed data to a destination device, including the destination network 170, the destination storage device 180, and the destination computer system 190. Similar to their source counterparts, the destination network 170 may connect to storage devices 172 and 174. The storage devices 172 and 174 may be any one of a NAS device, a DAS device, or a SAN device. The destination storage device 180 may have RAIDs 1801, . . . , 180$_N$; and the destination computer system 190 may have a desktop computer 192, a hard drive 194, a solid-state drive (flash devices) 196, and a thumb drive 198. The writing or storing data into these destination devices may be performed in a distributed manner. In other words, output data streams from the processing system 110 may be distributed over any combination of these destination devices. For example, if there are 4 output streams from the processing system 110, three may be stored in the RAIDs 180, and one may be stored in a cloud storage device.

The system 100 may operate in a writing mode or a reading mode. In the writing mode, a source stream S is available to be processed and written or stored in any of the destination devices 170/180/190. There are a number of embodiments in the writing mode, shown in FIGS. 2, 4-10. In the reading mode, a number of storage streams are available from a least a storage device 120/130/140 to be processed to recover or reconstitute the source stream S. There are a number of embodiments in the reading mode, shown in FIGS. 11-16. In essence, the process in the reading mode of the data streams $D_1$'s operates in reverse of the process that writes the data streams $D_1$'s to the storage device(s).

Figure 2:
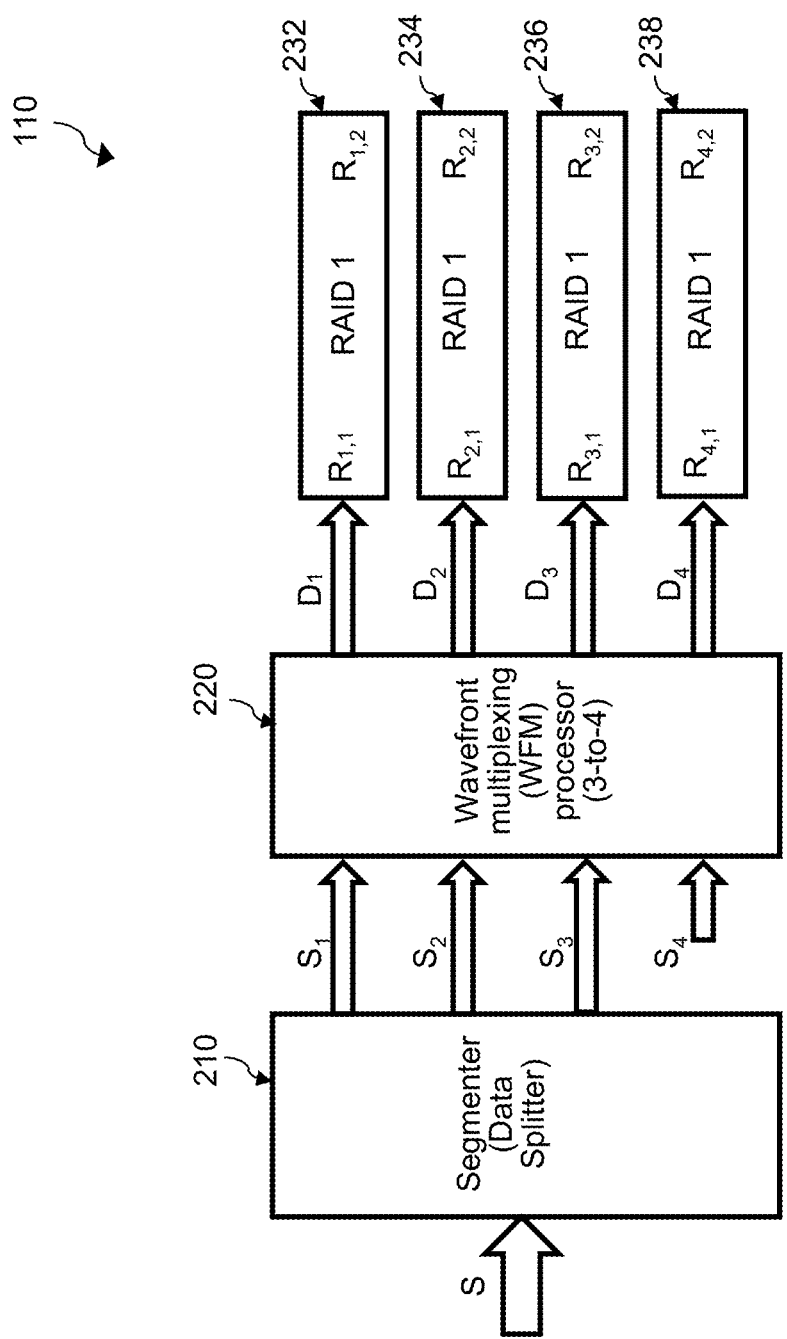
FIG. 2 is a diagram illustrating a data transport and/or storage processing system for transmitting or writing data to a storage system according to one embodiment.

FIG. 2 is a diagram illustrating the data transport and/or storage processing system 110 for transmitting or writing data to a storage system according to one embodiment. The processing system 110 may include a segmenter 210 and a WFM processor 220. The processing system 110 may include more or less than the above components. For clarity, components of the storage system 170/180/190 are shown in FIG. 2 as RAID 1 232, 234, 236, and 238. In other embodiments, any of the storage devices 170/180/190 may be used.

The segmenter 210 is a pre-processor that pre-processes the source stream S, which comes from a source device (e.g., the source network 120, the source storage system 130, or the source computer system 140) to produce the M input streams. In the illustrative example shown in FIG. 2, M=3. In other words, the segmenter 210 splits the source stream S into 3 data streams or segments $S_1$, $S_2$, and $S_3$. The splitting may be performed using a pre-determined method such as permutation.

The WFM processor 220 performs WFM on the M input streams to generate N output streams as the WF components (WFC). In the illustrative example in FIG. 2, M=3 and N=4. So, the WFM processor 220 performs the WFM on the 3 input streams or segments $S_1$, $S_2$, and $S_3$ to generate 4 output streams $D_1$, $D_2$, $D_3$, and $D_4$. The WFM is essentially a matrix multiplication of the input vector $S=(S_1, S_2, S_3)^T$ (T indicates a transpose vector) and the coefficient matrix $[w_{ij}]$ as follows:

$$\begin{bmatrix} D_1 \\ D_2 \\ D_3 \\ D_4 \end{bmatrix} = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \begin{bmatrix} S_1 \\ S_2 \\ S_3 \end{bmatrix}. \quad (1)$$

Equation (1) gives rise to the following:

$$D_1 = w_{11}S_1 + w_{12}S_2 + w_{13}S_3 \quad (2a)$$

$$D_2 = w_{21}S_1 + w_{22}S_2 + w_{23}S_3 \quad (2b)$$

$$D_3 = w_{31}S_1 + w_{32}S_2 + w_{33}S_3 \quad (2c)$$

$$D_4 = w_{41}S_1 + w_{42}S_2 + w_{43}S_3 \quad (2d)$$

As seen from the above equations, each of the output streams $D_i$'s (i=1, 2, 3, 4), may be considered as a linear combination of the coefficients $w_{ij}$'s (i=1, 2, 3, 4; j=1, 2, 3), and the input streams $S_j$'s (=1, 2, 3). To solve for $S_j$'s (=1, 2, 3), we need only three independent equations. Since there are 4 equations, one is extraneous and may be ignored. For example, the output $D_4$ may not be used. Alternatively, all 4 may be used with one being redundant, used for increasing fault tolerance in case one of the three outputs is in error or lost. Suppose $D_4$ is not used, the above set of equations reduces to (2a), (2b) and (2c) which can be solved by a number of methods such as substitution, elimination, or Kramer's rule, as are well known by one skilled in the art.

The three column vectors of the matrix in (1) represent three 'wavefronts' that feature three distribution patterns of segments $S_1$, $S_2$ and $S_3$ respectively. Each coefficient $w_{ij}$ can take real or complex value. As discussed above, any submatrix comprising three rows of the matrix in (1) has full rank in order to fulfill the redundancy requirements: any three wavefront components (WFCs) of $D_1$, $D_2$, $D_3$ and $D_4$ are sufficient to recover three segments $S_1$, $S_2$ and $S_3$.

Another way to envision this transformation is to assume there are 4 input streams $S_1$, $S_2$, $S_3$, and $S_4$, and the input vector [S] is a column vector with 4 components where $S_4$ is set to zero. The coefficient matrix therefore may be organized as a 4×4 matrix. The matrix multiplication may be performed as follows:

$$\begin{bmatrix} D_1 \\ D_2 \\ D_3 \\ D_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} S_1 \\ S_2 \\ S_3 \\ 0 \end{bmatrix}. \quad (3)$$

The output from each WFC is processed by RAID 1 that performs mirroring, namely replication. Data storage sites or devices 232, 234, 236, and 238 perform 'mirroring' functions such that $D_i = R_{i,1} = R_{i,2}$, i=1, 2, 3, 4. Four sets $\{R_{i,1}, R_{i,2}\}$, i=1, 2, 3, 4, may be stored in four physical and logical dimensions such as four separate network-attached storage (NAS) sites or devices. These NAS sites may be local NAS sites, on private cloud or on public cloud. One such distribution may feature three local NAS sites and the remaining one in a storage site on public cloud. The local distribution of three WFM data sites will be sufficient for reconstituting the stored data, while the one on cloud provides additional redundancy.

The WFM processor 220 may also be re-configured to take a known data stream as a $4^{th}$ input (not shown). This 'injected' data stream may appear as a dominating 'envelope' over the four WFCs $D_1$, $D_2$, $D_3$ and $D_4$. Systems, methods and apparatus for digital enveloping have been discussed extensively in the U.S. patent application Ser. No. 14/512,959, filed on Oct. 13, 2014. The WFM processor 220 may perform WFM on the M input streams including an envelope to generate the N output streams including an enveloped output stream which is substantially identical to the envelope.

Figure 3:
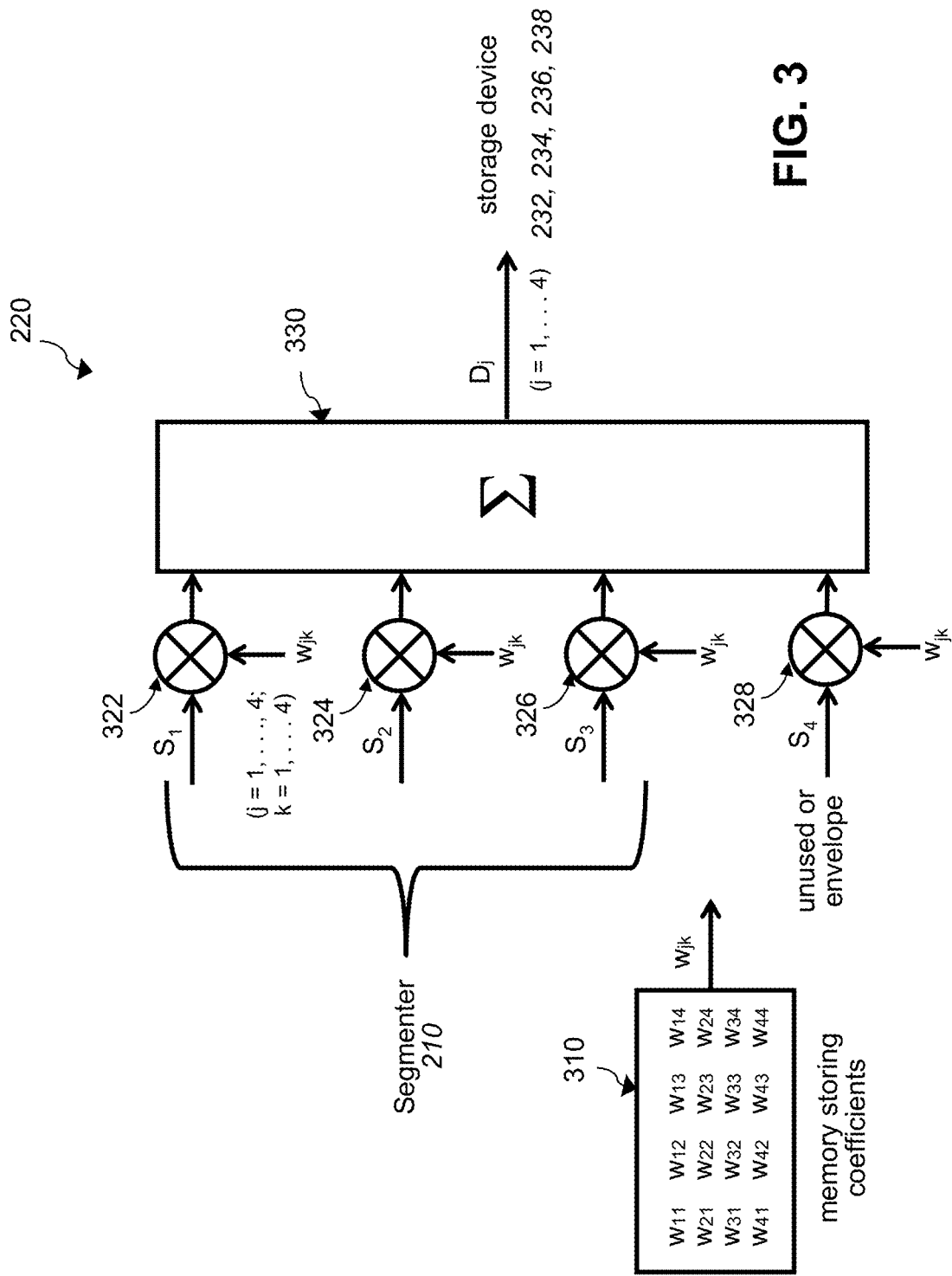
FIG. 3 is a diagram illustrating an architecture for the data transport and/or storage processing system according to one embodiment.

FIG. 3 is a diagram illustrating an architecture for the data transport and/or storage processing system 220 according to one embodiment. The architecture corresponds to the 4×4 matrix shown in Equation (2) above. The processing system 220 includes a storage device 310 such as a memory that stores the coefficients $w_{jk}$'s (j,k=1, . . . , 4), multipliers 322, 324, 326, and 328 and an adder 330. For fully parallel operations, four sets of the 4 multipliers and one adder will be needed. Any combination of devices may be employed. For example, a single multiplier and a 2-input adder may be used where the multiplier performs multiplication sequentially and the adder acts like an accumulator to accumulate the partial products. The input $S_4$ may be unused or used as an envelope for envelope processing as discussed above. The four multipliers 322, 324, 326, and 328 and the adder 330 may form a linear combiner that perform a linear combination of the coefficients $w_{jk}$'s and the input streams $S_k$'s as discussed above.

It should also be noted that while the architecture 220 is shown for the WFM processor, it is also applicable for the WFD processor because both types of processor involve a matrix multiplication. The differences are the types of inputs and outputs and the matrix coefficients in the memory 310.

Figure 4:
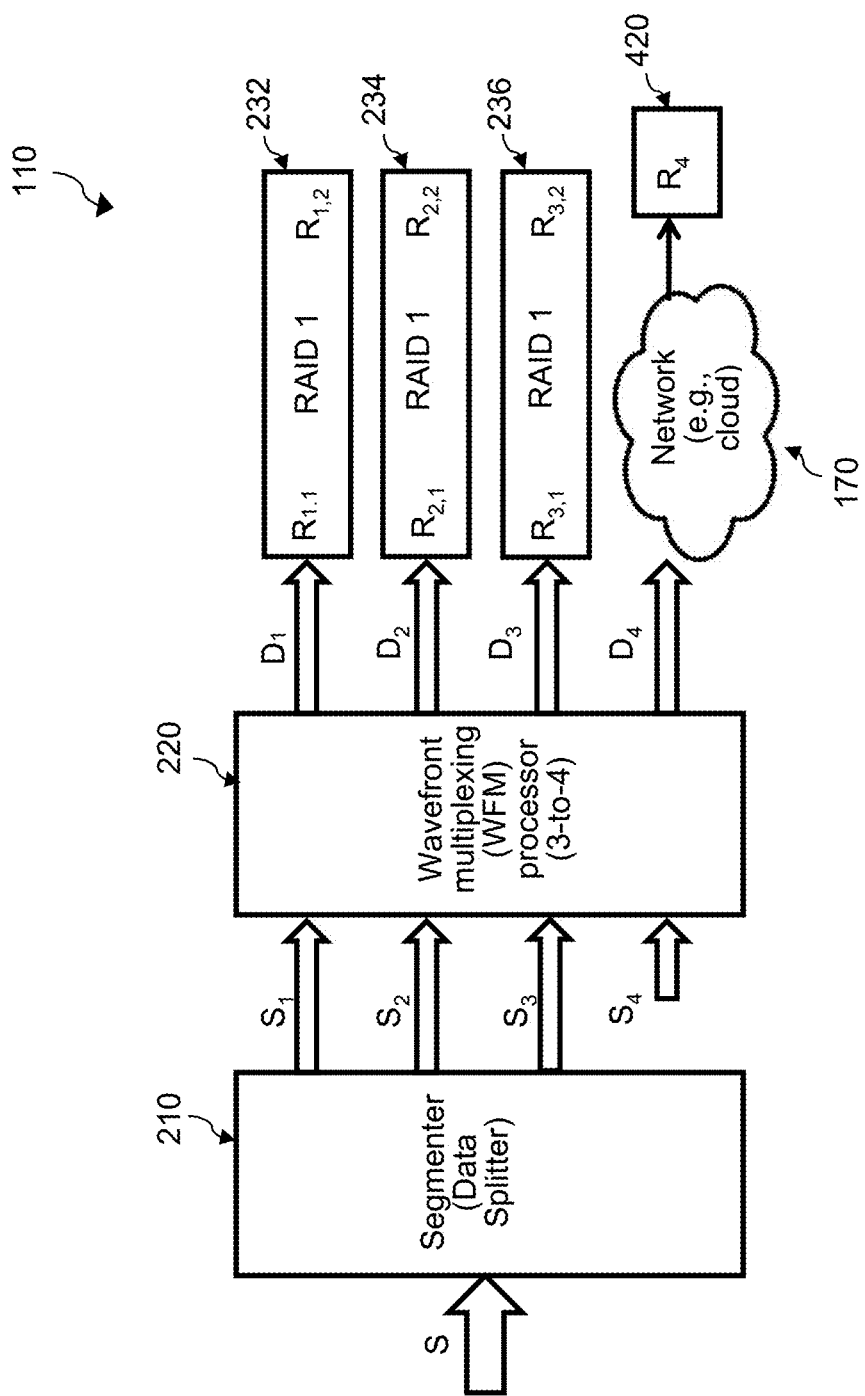
FIG. 4 is a diagram illustrating a data transport and/or storage processing system for transmitting or writing data to three local storage systems and one cloud storage device according to one embodiment.

FIG. 4 is a diagram illustrating the data transport and/or storage processing system 110 for transmitting or writing data to three local storage systems and one cloud storage device according to one embodiment. The processing system 110 in FIG. 4 is similar to the system 110 in FIG. 2 except that the RAID 1 device 238 is replaced by the network cloud 170 and a storage device $R_4$ 420.

The WFM processor 220 performs WFM on the three input streams $S_1$, $S_2$ and $S_3$ and generates the four output streams WFCs $D_1$, $D_2$, $D_3$ and $D_4$ as given in equation (1) above. The three output streams $D_1$, $D_2$, $D_3$ are written or stored in three local storage devices 232, 234, and 236, respectively (e.g., local NAS sites). The output stream $D_4$ may be stored in a public storage $R_4$ 420 via cloud 170. As discussed above, the data stored locally are sufficient to recover the segmented streams $S_1$, $S_2$, and $S_3$. In case one is lost or the corresponding NAS site fails, the data $D_4$ may be retrieved from the cloud storage 420. It then can be used together with the remaining two data streams to recover the segmented streams $S_1$, $S_2$, and $S_3$.

Figure 5:
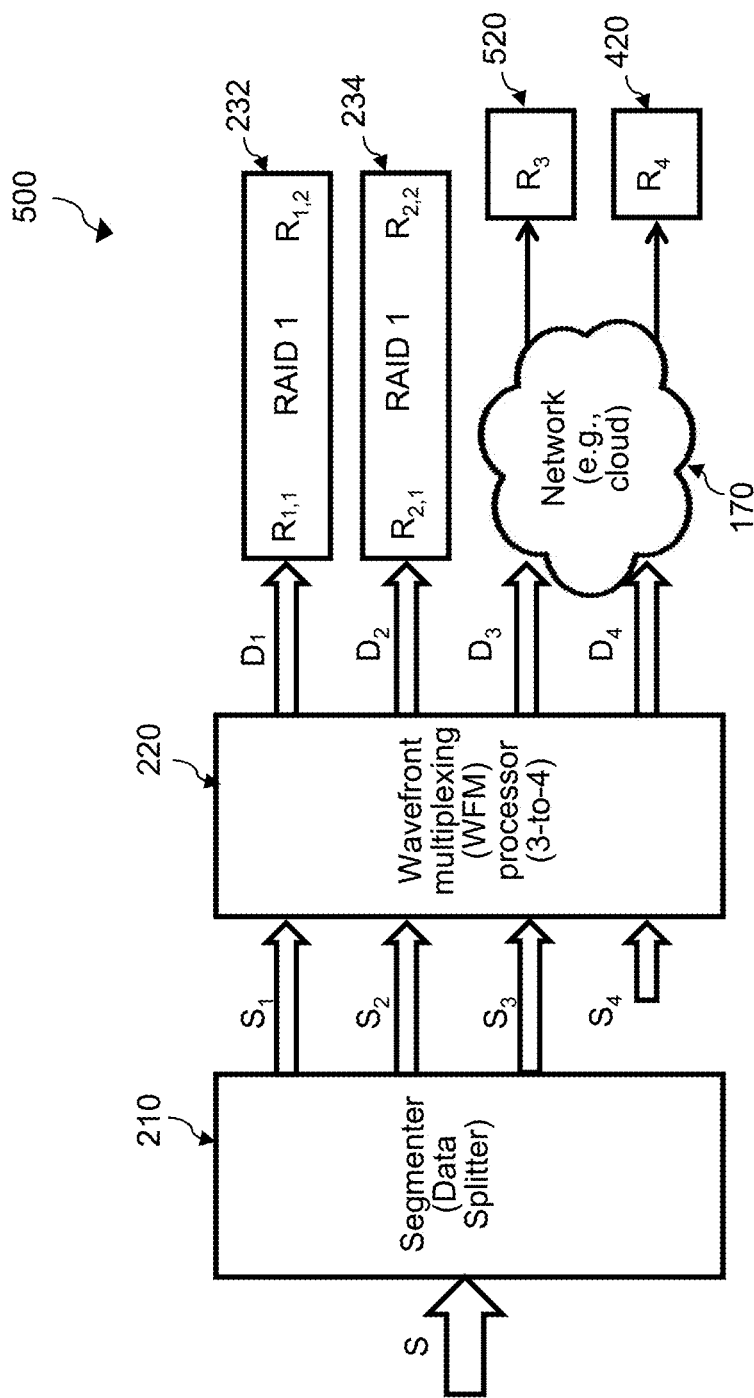
FIG. 5 is a diagram illustrating a data transport and/or storage processing system for transmitting or writing data to two local storage systems and two cloud storage devices according to one embodiment.

FIG. 5 is a diagram illustrating the data transport and/or storage processing system 110 for transmitting or writing data to two local storage systems and two cloud storage devices according to one embodiment. The processing system 110 in FIG. 5 is similar to the system 110 in FIG. 2 except that the RAID 1 device 238 and RAID 1 device 236 are replaced by the network cloud 170 and two storage devices $R_3$ 520 and $R_4$ 420.

As discussed above, the two data streams $D_1$ and $D_2$ stored in the local NAS devices 232 and 234 are not sufficient to recover the segmented streams $S_1$, $S_2$, and $S_3$. One data stream stored on the cloud devices $R_3$ 520 and $R_4$ 420 may be retrieved to be used together with the two data streams $D_1$ and $D_2$ to recover the segmented streams $S_1$, $S_2$, and $S_3$.

Figure 6:
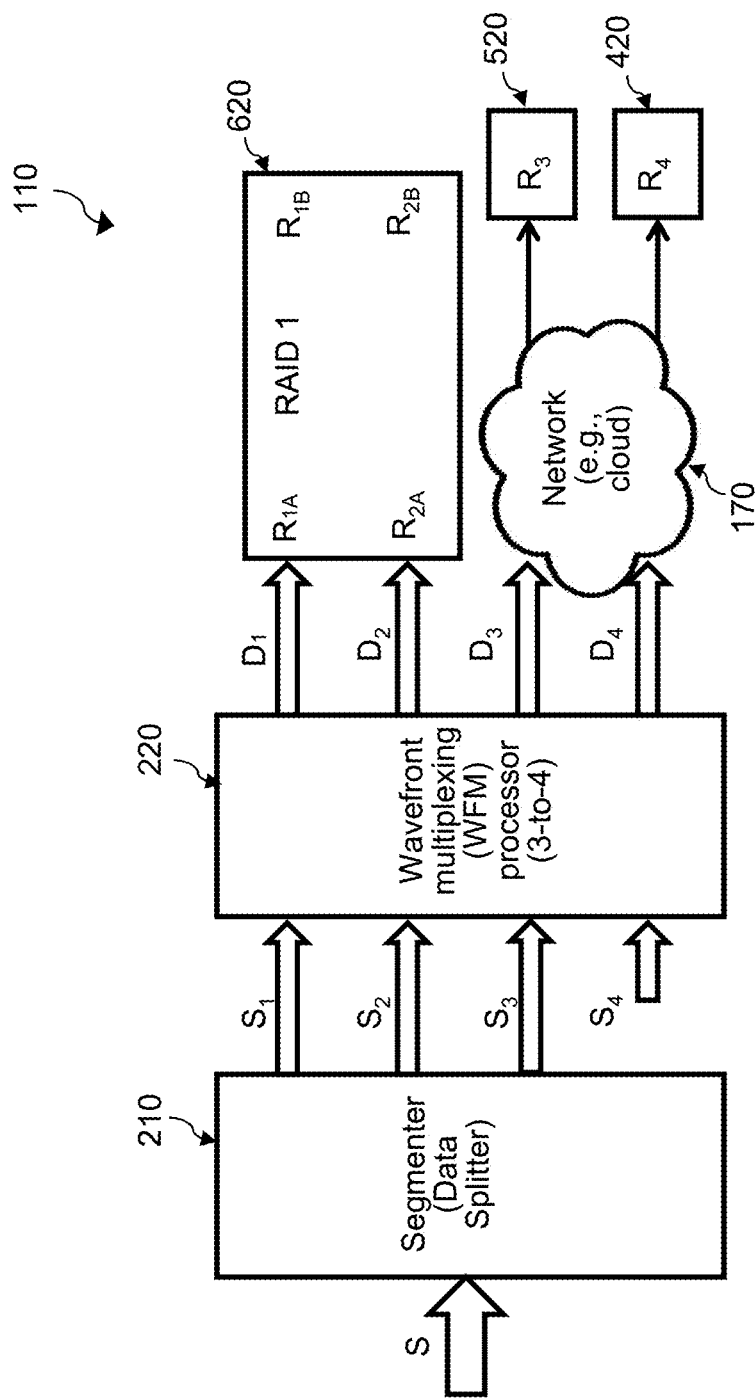
FIG. 6 is a diagram illustrating a data transport and/or storage processing system for transmitting or writing data to a storage system having two devices and two cloud storage devices according to one embodiment.

FIG. 6 is a diagram illustrating a data transport and/or storage processing system for transmitting or writing data to a storage system having two devices and two cloud storage devices according to one embodiment. The processing system 110 in FIG. 6 is similar to the processing system 110 in FIG. 5 except that the two NAS sites RAID 1 device 232 and RAID 1 device 234 are replaced by a local NAS site 620 that stores $D_1$ and $D_2$ in a RAID 1 manner (i.e., mirroring).

As above, the two data streams $D_1$ and $D_2$ stored in the local NAS device 620 are not sufficient to recover the segmented streams $S_1$, $S_2$, and $S_3$. One data stream stored on the cloud devices R3 520 and R4 420 may be retrieved to be used together with the two data streams $D_1$ and $D_2$ to recover the segmented streams $S_1$, $S_2$, and $S_3$.

Figure 7:
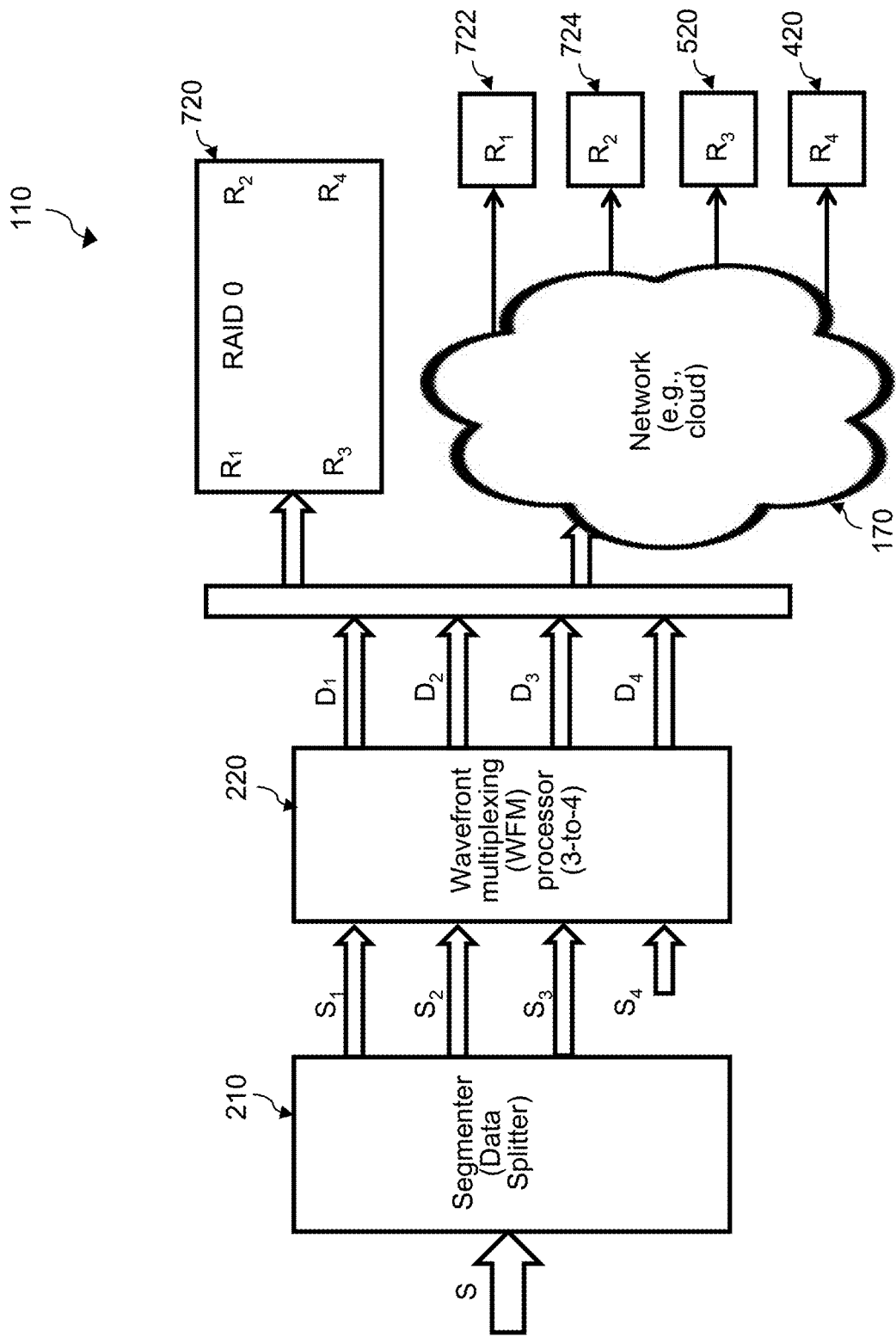
FIG. 7 is a diagram illustrating a data transport and/or storage processing system for transmitting or writing data to a storage system and four cloud storage devices according to one embodiment.

FIG. 7 is a diagram illustrating the data transport and/or storage processing system 110 for transmitting or writing data to a storage system and four cloud storage devices according to one embodiment. The processing system 110 is similar to the processing system 110 in FIGS. 2, 4-6 except in the destination storage devices. In FIG. 7, the 4 output streams $D_1$, $D_2$, $D_3$, and $D_4$ are stored in local NAS site 720 in a RAID 0 configuration and are also stored in four storage devices $R_1$ 722, $R_2$ 724, $R_3$ 520, and $R_4$ 420.

In the local NAS site 720, four storage devices store all four but not redundantly. Therefore, while there is no local redundancy, any three of the data streams may be retrieved to reconstitute the segmented streams $S_1$, $S_2$, and $S_3$. If one or two of the devices fail, the data streams may be retrieved from the corresponding cloud storage devices.

Figure 8:
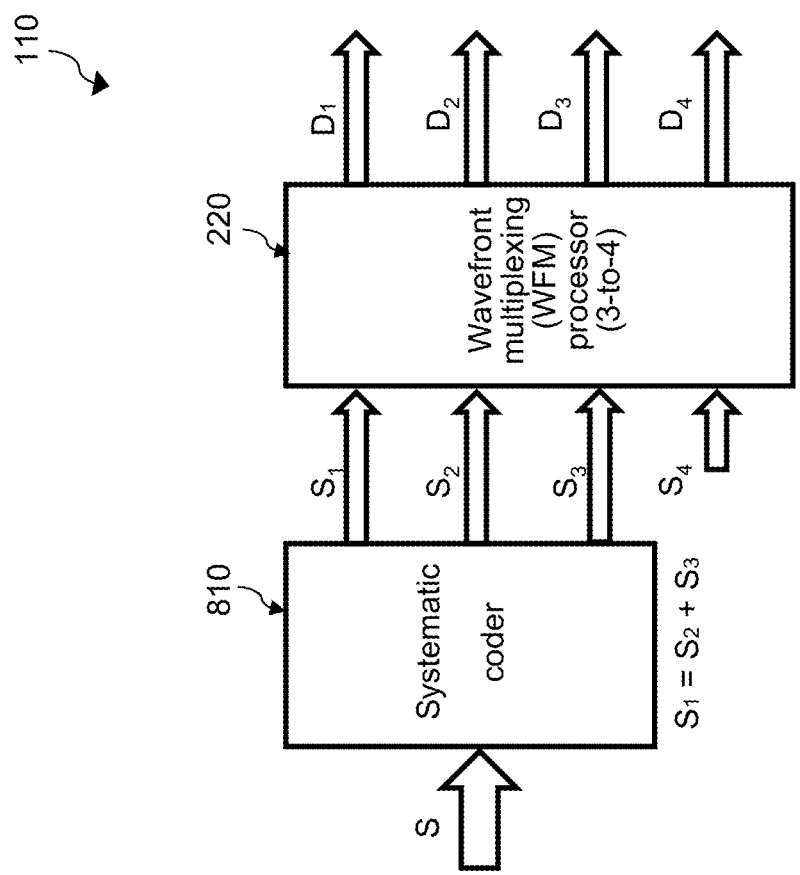
FIG. 8 is a diagram illustrating a data transport and/or storage processing system for transmitting or writing data using a systematic coder according to one embodiment.

FIG. 8 is a diagram illustrating the data transport and/or storage processing system 110 for transmitting or writing data using a systematic coder according to one embodiment. The processing system 110 includes a systematic code 810 and the WFM processor 220. The WFM processor 220 is similar to the WFM processor 220 in FIG. 2 and therefore does not need further description. Similarly, the writing or storing the four output streams $D_1$, $D_2$, $D_3$, and $D_4$ may be any one of the previously described schemes in FIGS. 2-7 and therefore is not described further.

The systematic coder 810 transforms or converts the source stream S into three input streams $S_1$, $S_2$, and $S_3$. The systematic coder 810 encodes the source stream S with a systematic code and then splits the encoded stream into three input streams $S_1$, $S_2$, and $S_3$. A systematic code may be any error-correcting code in which the data in the source stream is embedded in the encoded data. For example, checksums and hash functions may be combined with the source stream. As another example, $S_3$ may be the parity data stream as a numerical combination of $S_1$ and $S_2$. Any two of the three input streams $S_1$, $S_2$, and $S_3$ may be used to reconstitute the source stream S.

Figure 9:
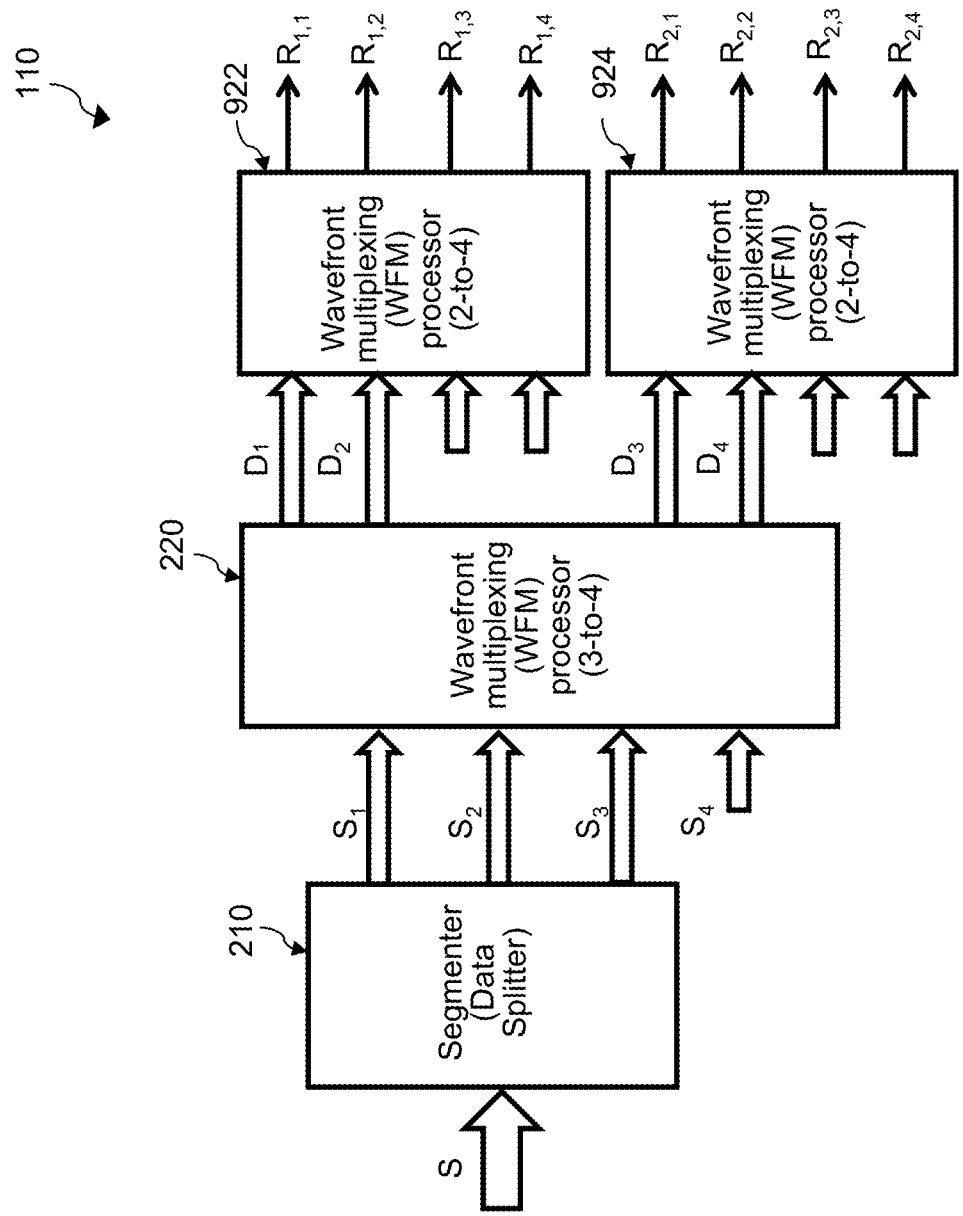
FIG. 9 is a diagram illustrating a data transport and/or storage processing system for transmitting or writing data using a cascaded structure for the WFM processor according to one embodiment.

FIG. 9 is a diagram illustrating the data transport and/or storage processing system 110 for transmitting or writing data using a cascaded structure for the WFM processor according to one embodiment. The processing system 110 in FIG. 9 is similar to the processing system 110 in FIG. 2 except that the WFM operation is performed by additional WFM processors arranged in a serially cascaded configuration.

The cascaded structure includes two levels of WFM processors. In the first level, a first WFM processor performs WFM on M input streams to generate N output streams. In the second level, a second WFM processor performs WFM on the N output streams to produce storage streams to be stored in a storage device. In the illustrative example in FIG. 9, the first level WFM processor is the WFM processor 220 and the second WFM processor includes two WFM processors 922 and 924 each operating on a subset of N data streams. Specifically, the WFM processor 220 performs WFM on the input streams $S_1$, $S_2$, and $S_3$ to produce the four output streams $D_1$, $D_2$, $D_3$, and $D_4$. The WFM processor 922 performs WFM on two streams $D_1$ and $D_2$, to generate four storage streams $R_{1,1}$, $R_{1,2}$, $R_{1,3}$, and $R_{1,4}$. The WFM processor 924 performs WFM on two streams $D_3$ and $D_4$, to generate four storage streams $R_{2,1}$, $R_{2,2}$, $R_{2,3}$, and $R_{2,4}$.

The WFM performed by the WFM processor 922 and 924 is similar to that performed by the WFM 220 except the number of inputs and the matrix coefficients are different. The WFM processor 922 performs the WFM as a matrix multiplication as follows:

$$\begin{bmatrix} R_{1,1} \\ R_{1,2} \\ R_{1,3} \\ R_{1,4} \end{bmatrix} = \begin{bmatrix} \rho_{11} & \rho_{12} \\ \rho_{21} & \rho_{22} \\ \rho_{31} & \rho_{32} \\ \rho_{41} & \rho_{42} \end{bmatrix} \begin{bmatrix} D_1 \\ D_2 \end{bmatrix}. \quad (4)$$

Similarly, as in FIG. 2, the coefficient $\rho_{ij}$'s may take real or complex values. Any sub-matrix comprising two rows of the matrix in (4) has full rank in order to fulfill the redundancy requirements: any two WFCs of $R_{1,1}$, $R_{1,2}$, $R_{1,3}$ and $R_{1,4}$ are sufficient to recover two WFCs $D_1$ and $D_2$. The WFM processor 924 may follow a similar configuration: any two WFCs of $R_{2,1}$, $R_{2,2}$, $R_{2,3}$ and $R_{2,4}$ are sufficient to recover two WFCs $D_3$ and $D_4$.

The writing or storing of the storage streams $R_{1,1}$, $R_{1,2}$, $R_{1,3}$ and $R_{1,4}$ and $R_{2,1}$, $R_{2,2}$, $R_{2,3}$ and $R_{2,4}$ is similar to the embodiments described earlier in FIGS. 2, 4-6.

Figure 10:
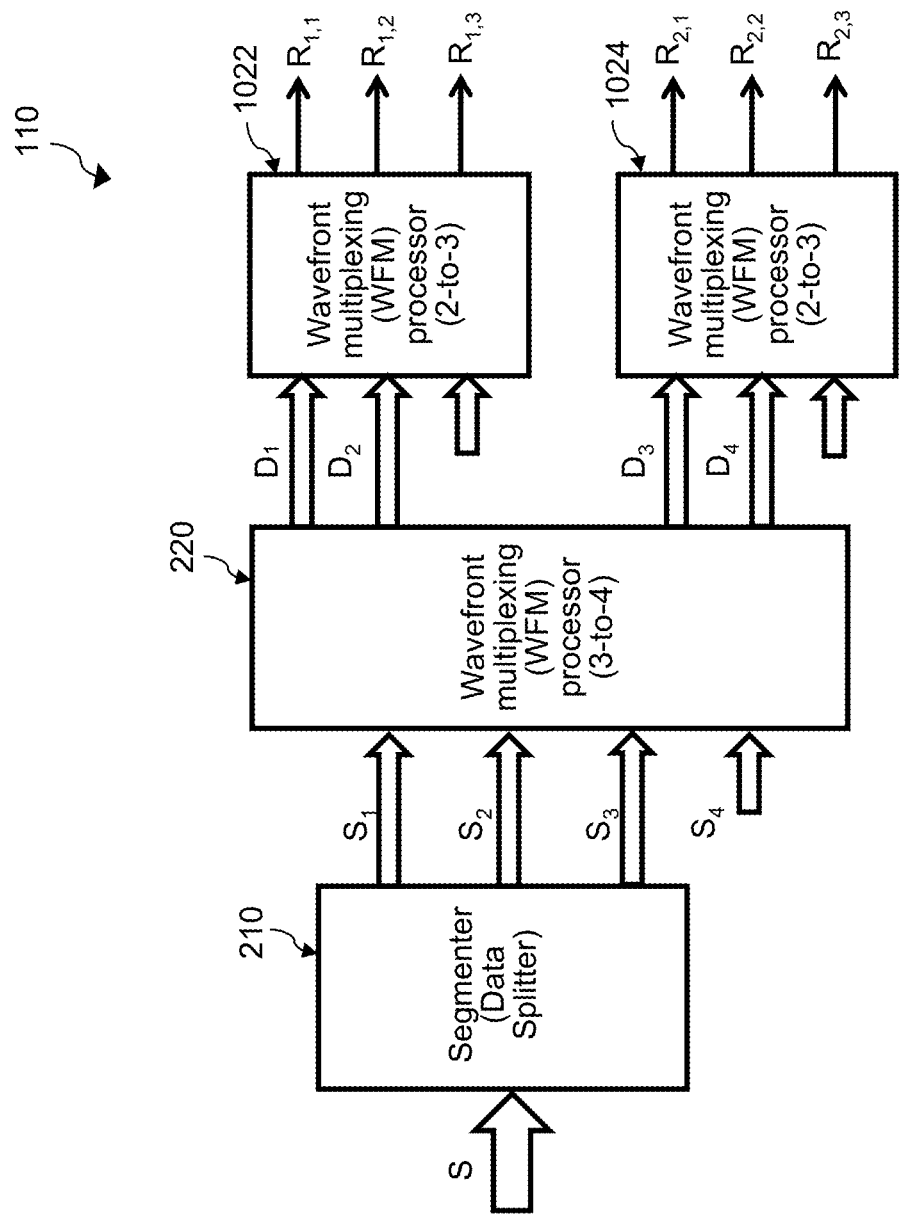
FIG. 10 is a diagram illustrating a data transport and/or storage processing system for transmitting or writing data using a cascaded structure for the WFM processor according to one embodiment.

FIG. 10 is a diagram illustrating the data transport and/or storage processing system 110 for transmitting or writing data using a cascaded structure for the WFM processor according to one embodiment. The processing system 110 in FIG. 10 is similar to the processing system 110 in FIG. 9 except that the WFM processors in the second level each generates three storage streams. The processing system 110 includes the segmenter 210, the WFM processor 220, and two WFM processors 1022 and 1034.

The WFM processor 1022 performs WFM on two streams $D_1$ and $D_2$, to generate three storage streams $R_{1,1}$, $R_{1,2}$, and $R_{1,3}$. The WFM processor 924 performs WFM on two streams $D_3$ and $D_4$, to generate three storage streams $R_{2,1}$, $R_{2,2}$, and $R_{2,3}$.

The WFM performed by the WFM processor 1022 and 1024 is similar to that performed by the WFM 220 except the number of inputs and the matrix coefficients are different. The WFM processor 1022 performs the WFM as a matrix multiplication as follows:

$$\begin{bmatrix} R_{1,1} \\ R_{1,2} \\ R_{1,3} \end{bmatrix} = \begin{bmatrix} \sigma_{11} & \sigma_{12} \\ \sigma_{21} & \sigma_{22} \\ \sigma_{31} & \sigma_{32} \end{bmatrix} \begin{bmatrix} D_1 \\ D_2 \end{bmatrix} \quad (5)$$

Similarly, as in FIG. 9, the coefficient $\rho_{ij}$'s may take real or complex values. Any sub-matrix comprising two rows of the matrix in (5) has full rank in order to fulfill the redundancy requirements: any two WFCs of $R_{1,1}$, $R_{1,2}$, and $R_{1,3}$ are sufficient to recover two WFCs $D_1$ and $D_2$. The WFM processor 1024 may follow a similar configuration: any two WFCs of $R_{2,1}$, $R_{2,2}$, and $R_{2,3}$ are sufficient to recover two WFCs $D_3$ and $D_4$.

The writing or storing of the storage streams $R_{1,1}$, $R_{1,2}$, and $R_{1,3}$ and $R_{2,1}$, $R_{2,2}$, and $R_{2,3}$ is similar to the embodiments described earlier in FIGS. 2, 4-6.

Figure 11:
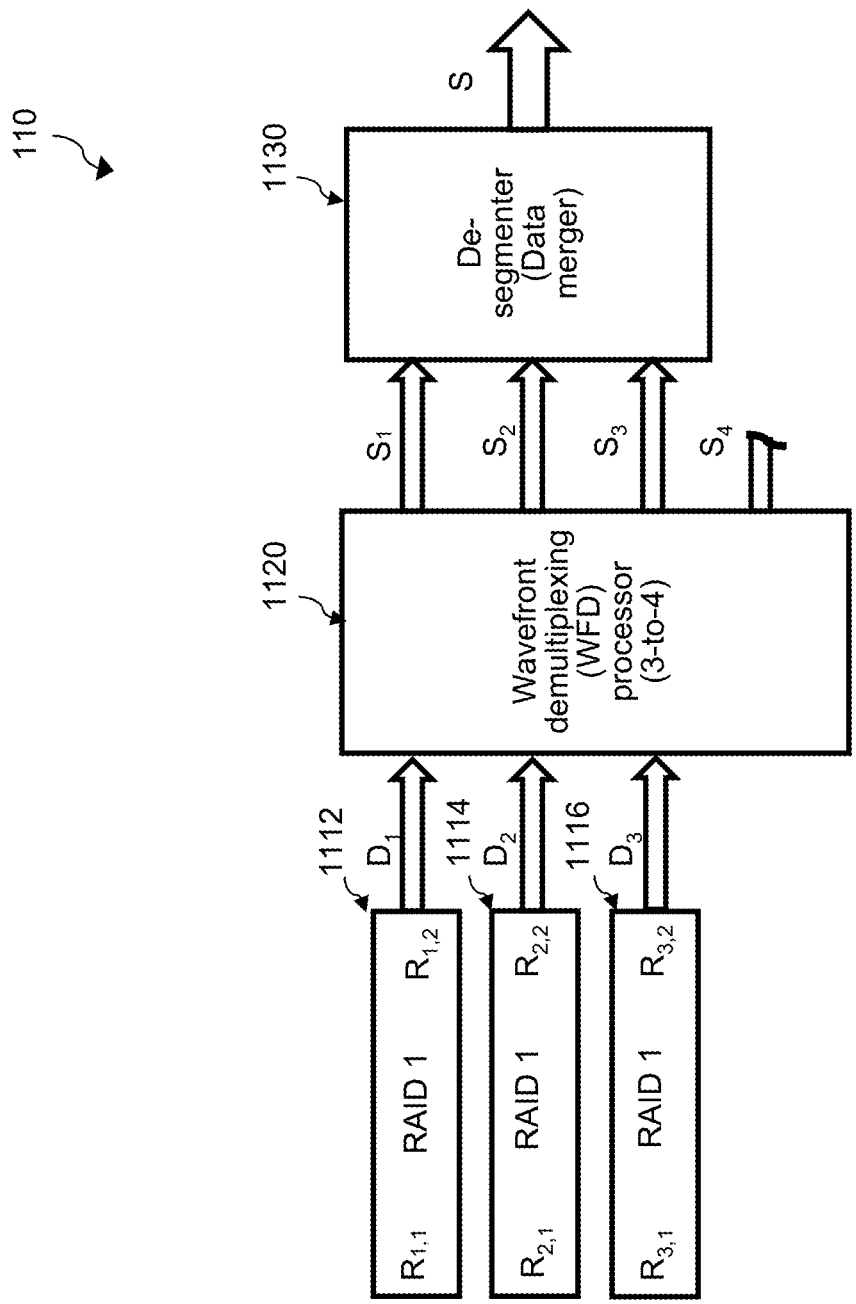
FIG. 11 is a diagram illustrating a data transport and/or storage processing system for receiving or reading data from a storage system according to one embodiment.

FIG. 11 is a diagram illustrating the data transport and/or storage processing system 110 for receiving or reading data from a storage system according to one embodiment. The processing system 110 includes storage devices 1112, 1114, and 1116, WF de-multiplexing (WFD) processor 1120, and a de-segmenter 1130. The processing system 110 may include more or less than the above components. For clarity, components of the storage system 120/130/140 are shown in FIG. 11 as RAID 1112, 1114, and 1116. In other embodiments, any of the storage devices 120/130/140 may be used.

The storage devices 1112, 1114, and 1116 represent any of the source storage devices 120, 130 and 140 shown in FIG. 1. In the illustrative example shown in FIG. 11, they are NAS storage devices configured as RAID 1. The storage device 1112 stores mirrored data in $R_{1,1}$ and $R_{1,2}$ which include the stream $D_1$. The storage device 1114 stores mirrored data in $R_{2,1}$ and $R_{2,2}$ which include the stream $D_2$. The storage device 1116 stores mirrored data in $R_{3,1}$ and $R_{3,2}$ which include the stream $D_3$.

The WFD processor 1120 performs WFD on M input streams to generate N output streams. In the illustrative example in FIG. 11, M=3 and N=4. The WFD processor 1120 performs WFD on the 3 input streams $D_1$, $D_2$, and $D_3$, and generates 4 output streams $S_1$, $S_2$, $S_3$, and $S_4$. The WFD essentially is the reverse operation of the WFM. To successfully recover the original source stream S, at least three NAS sites should be available. This operation is a matrix multiplication of the column vector $(D_1, D_2, D_3)^T$ using the following equations to recover the column vector $(S_1, S_2, S_3, S_4)^T$:

$$S_1 = w_{11} D_1 + w_{12} D_2 + w_{13} D_3 \quad (6a)$$

$$S_2 = w_{21} D_1 + w_{22} D_2 + w_{23} D_3 \quad (6b)$$

$$S_3 = w_{31} D_1 + w_{32} D_2 + w_{33} D_3 \quad (6c)$$

$$S_4 = w_{41} D_1 + w_{42} D_2 + w_{43} D_3 \quad (6d)$$

The WFD processor 1120 may generate one redundant data stream $S_4$. This data stream $S_4$ may be left unused or is used for integrity check against possible compromised stored/transported data streams.

When the M input streams are known to be generated using an envelope, the first WFD processor performs WFD on the M input streams including an envelope to generate the N output streams including a de-enveloped output stream.

The de-segmenter 1130 acts as a post-processor to de-segment or to merge the output streams $S_1$, $S_2$, $S_3$, and $S_4$ into the source stream S. The de-segmentation is the reverse of the known segmentation in the writing or storing process.

Figure 12:
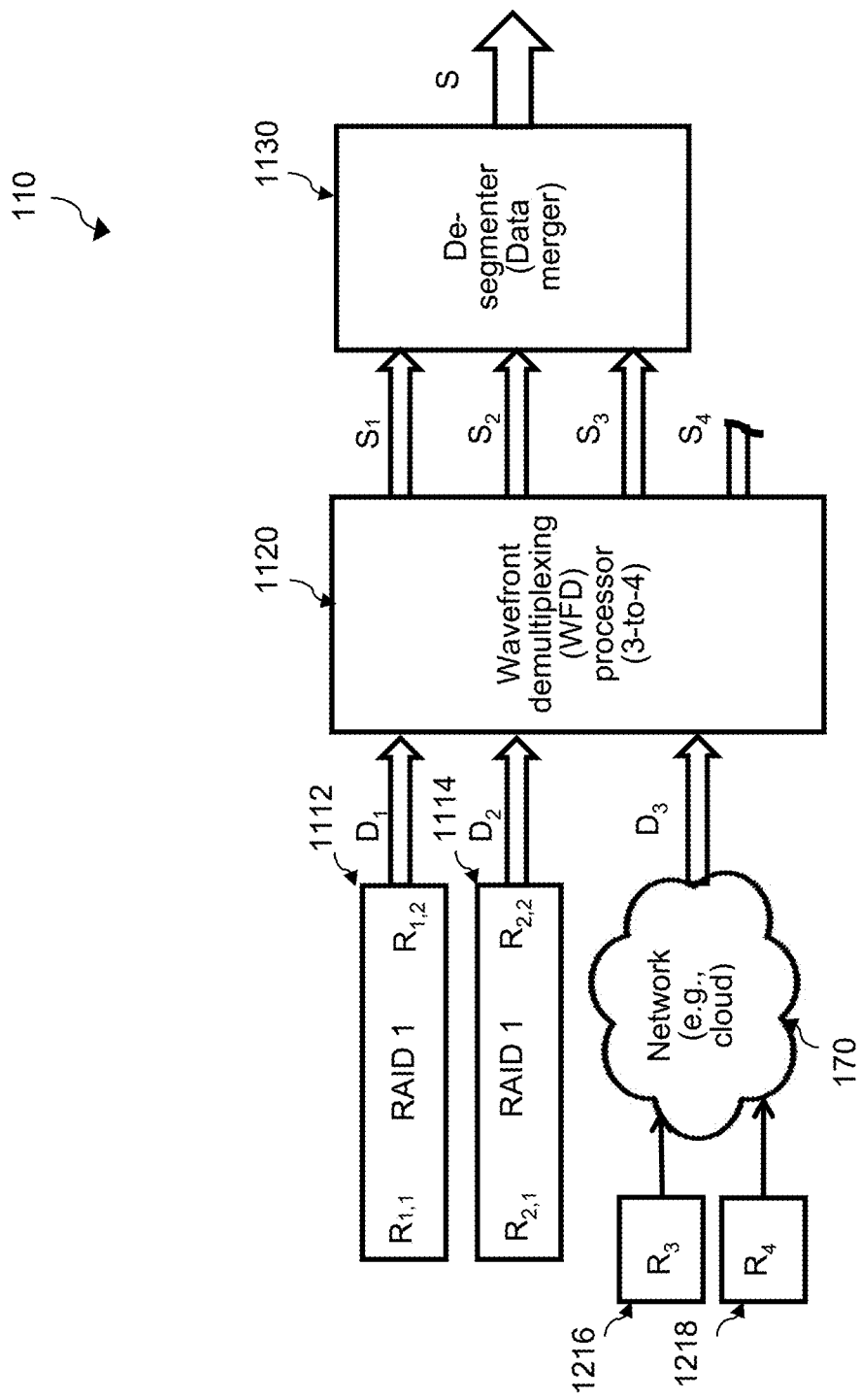
FIG. 12 is a diagram illustrating a data transport and/or storage processing system for receiving or reading data from a storage system and a cloud storage according to one embodiment.

FIG. 12 is a diagram illustrating the data transport and/or storage processing system 110 for receiving or reading data from two local storage systems and two cloud storage devices according to one embodiment. The processing system 110 is configured to correspond to the configuration shown in FIG. 5. The storage system 120/130/140 in FIG. 12 is similar to the storage system 170/180/190 shown in FIG. 5. This configuration includes two local storage systems such as NAS devices 1112 and 1114 and two cloud storage devices $R_3$ 1216 and $R_4$ 1218 via the cloud 120.

The WFD processor 1120 performs WFD on M input streams to generate N output streams. In the illustrative example in FIG. 12, M=3 and N=4. The WFD processor 1120 performs WFD on the 3 input streams $D_1$, $D_2$, and $D_3$, and generates 4 output streams $S_1$, $S_2$, $S_3$, and $S_4$. The WFD essentially is the reverse operation of the WFM. As in the configuration in FIG. 11, the WFD processor 1120 may generate one redundant data stream $S_4$. This data stream $S_4$ may be left unused or is used for integrity check against possible compromised stored/transported data streams. The de-segmenter 1130 acts as a post-processor to de-segment or to merge the output streams $S_1$, $S_2$, $S_3$, and $S_4$ into the source stream S. The de-segmentation is the reverse of the known segmentation in the writing or storing process.

Figure 13:
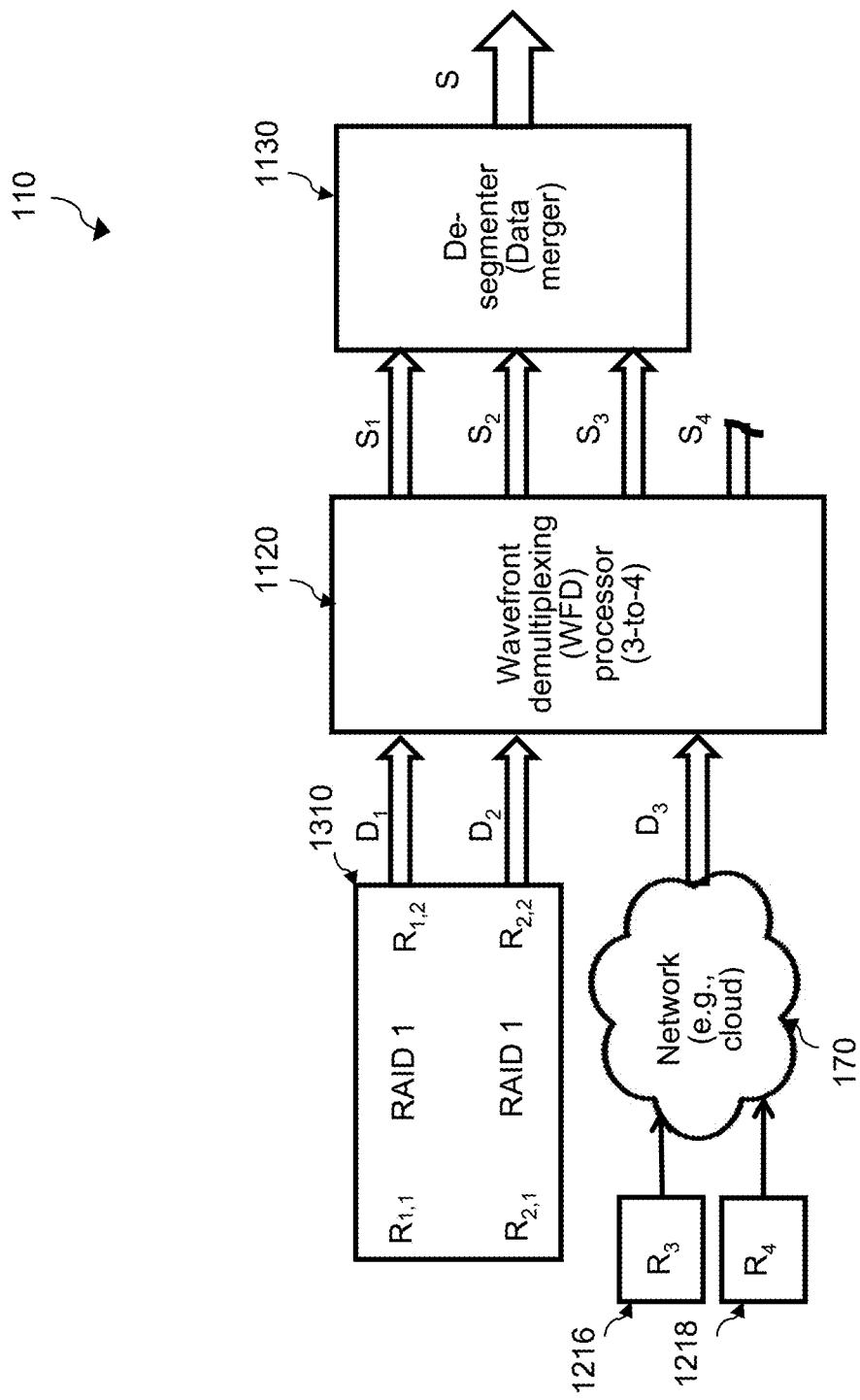
FIG. 13 is a diagram illustrating a data transport and/or storage processing system for receiving or reading data from a storage system and a cloud storage according to one embodiment.

FIG. 13 is a diagram illustrating the data transport and/or storage processing system 110 for receiving or reading data from a local storage system and two cloud storage devices according to one embodiment. The processing system 110 is configured to correspond to the configuration shown in FIG. 6. The storage system 120/130/140 in FIG. 12 is similar to the storage system 170/180/190 shown in FIG. 6. This configuration includes a local storage site 1310 having two storage systems such as NAS devices as RAID 1 to store data streams $R_1$ and $R_2$ in mirrored format and two cloud storage devices $R_3$ 1216 and $R_4$ 1218 via the cloud 120.

The WFD processor 1120 performs WFD on M input streams to generate N output streams. In the illustrative example in FIG. 12, M=3 and N=4. The WFD processor 1120 performs WFD on the 3 input streams $D_1$, $D_2$, and $D_3$, and generates 4 output streams $S_1$, $S_2$, $S_3$, and $S_4$. The WFD essentially is the reverse operation of the WFM. As in the configuration in FIG. 11, the WFD processor 1120 may generate one redundant data stream $S_4$. This data stream $S_4$ may be left unused or is used for integrity check against possible compromised stored/transported data streams. The de-segmenter 1130 acts as a post-processor to de-segment or to merge the output streams $S_1$, $S_2$, $S_3$, and $S_4$ into the source stream S. The de-segmentation is the reverse of the known segmentation in the writing or storing process.

Figure 14:
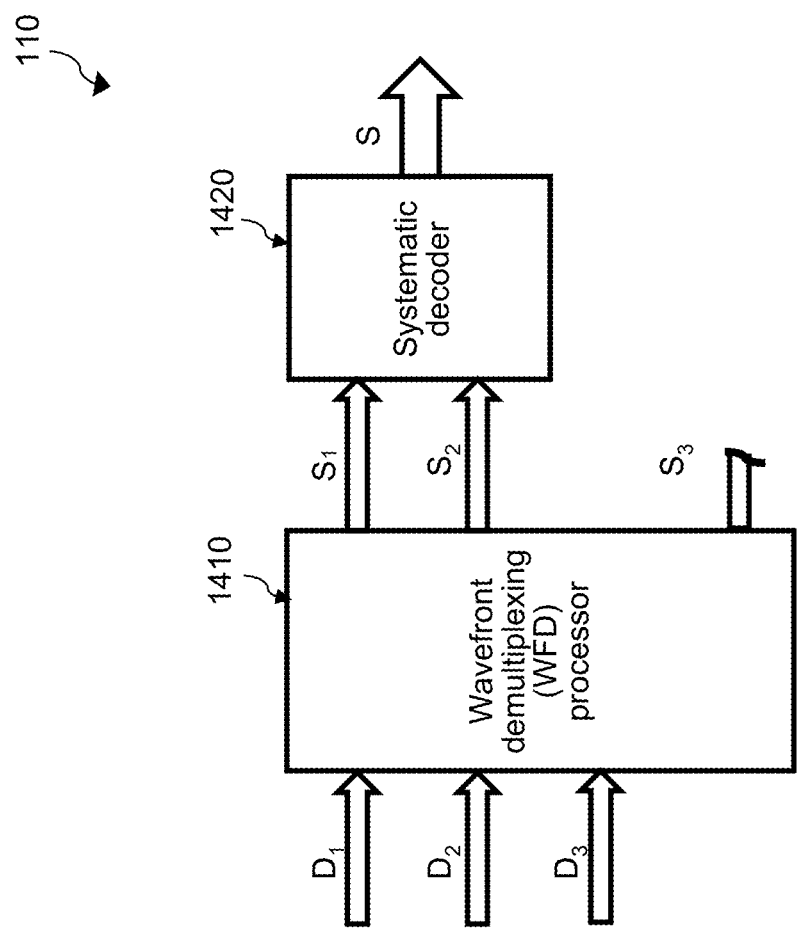
FIG. 14 is a diagram illustrating a data transport and/or storage processing system for receiving or reading data using a systematic decoder according to one embodiment.

FIG. 14 is a diagram illustrating the data transport and/or storage processing system 110 for receiving or reading data using a systematic decoder according to one embodiment. The processing system 110 includes a WFD processor 1410 and a systematic decoder 1420. The configuration in FIG. 14 corresponds to the reverse process of the configuration in FIG. 8.

The WFD processor 1120 performs WFD on M input streams to generate N output streams. In the illustrative example in FIG. 11, M=3 and N=2. The WFD processor 1410 performs WFD on the 3 input streams $D_1$, $D_2$, and $D_3$, and generates 3 output streams $S_1$, $S_2$, and $S_3$. The WFD essentially is the reverse operation of the WFM. To successfully recover the original source stream S, at least three NAS sites should be available. This operation is a matrix multiplication of the column vector $(D_1, D_2, D_3)^T$ using the following equations to recover the column vector $(S_1, S_2, S_3)^T$:

$$S_1 = w_{11} \cdot D_1 + w_{12} \cdot D_2 + w_{13} \cdot D_3 \quad (7a)$$

$$S_2 = w_{21} \cdot D_1 + w_{22} \cdot D_2 + w_{23} \cdot D_3 \quad (7b)$$

$$S_3 = w_{31} \cdot D_1 + w_{32} \cdot D_2 + w_{33} \cdot D_3 \quad (7c)$$

Figure 15:
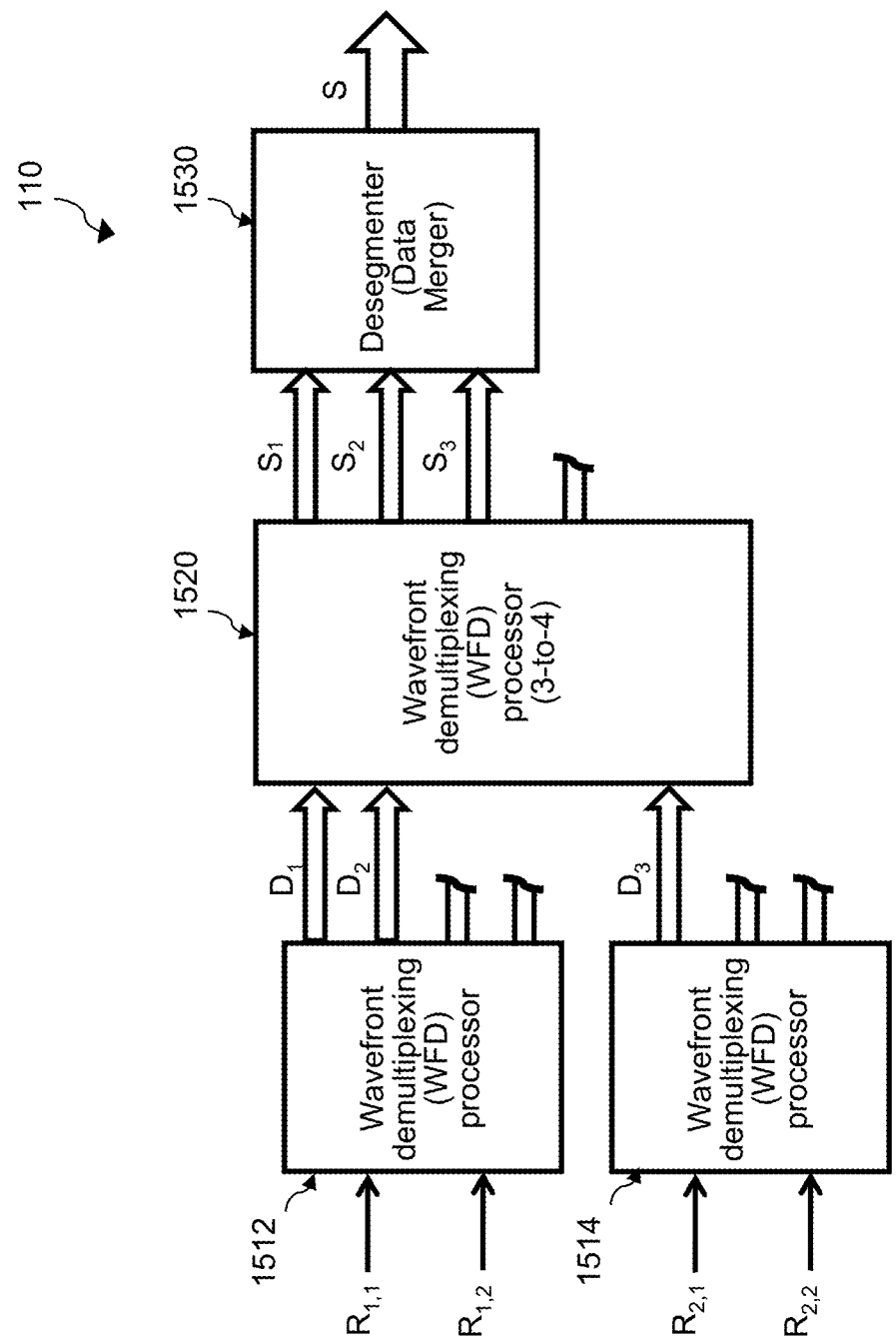
FIG. 15 is a diagram illustrating a data transport and/or storage processing system for receiving or reading data using a cascaded structure for the WFD processor according to one embodiment.

FIG. 15 is a diagram illustrating the data transport and/or storage processing system 110 for receiving or reading data using a cascaded structure for the WFD processor according to one embodiment. The processing system 110 includes a WFD processor 1520, two WFD processors 1512 and 1514, and a de-segmenter 1530. The processing system 110 may include more or less than the above components.

The cascade structure includes two levels. In the first level, the two WFD processors 1512 and 1514 perform WFD on the retrieved data streams $R_{1,1}$, $R_{1,2}$, $R_{2,1}$, and $R_{2,2}$ to generate the input streams $D_1$, $D_2$, and $D_3$. The WFD processor 1512 operates on the two storage streams $R_{1,1}$ and $R_{1,2}$ and generates 4 outputs, two of which are $D_1$ and $D_2$; the other two outputs may be unused or may be used for integrity check against possible compromised stored/transported data streams. As discussed above, the WFD may be performed by a matrix multiplication using the inverse matrix of:

$$\begin{bmatrix} \rho_{11} & \rho_{12} \\ \rho_{21} & \rho_{22} \end{bmatrix}$$

The WFD processor 1514 operates on the two storage streams $R_{2,1}$ and $R_{2,2}$ and generates 3 outputs, one of which is $D_3$; the other two outputs may be unused or may be used for integrity check against possible compromised stored/transported data streams.

In the second level, the WFD processor 1520 perform WFD on the three input streams $D_1$, $D_2$, and $D_3$ to generate 3 output streams $S_1$, $S_2$, and $S_3$. As discussed above, the WFD may be performed as a matrix multiplication using the inverse matrix of the matrix used to generate $D_1$, $D_2$, and $D_3$ in the writing or storing process.

The de-segmenter 1530 acts as a post-processor to de-segment or to merge the output streams $S_1$, $S_2$, and $S_3$ into the source stream S. The de-segmentation is the reverse of the known segmentation in the writing or storing process.

Figure 16:
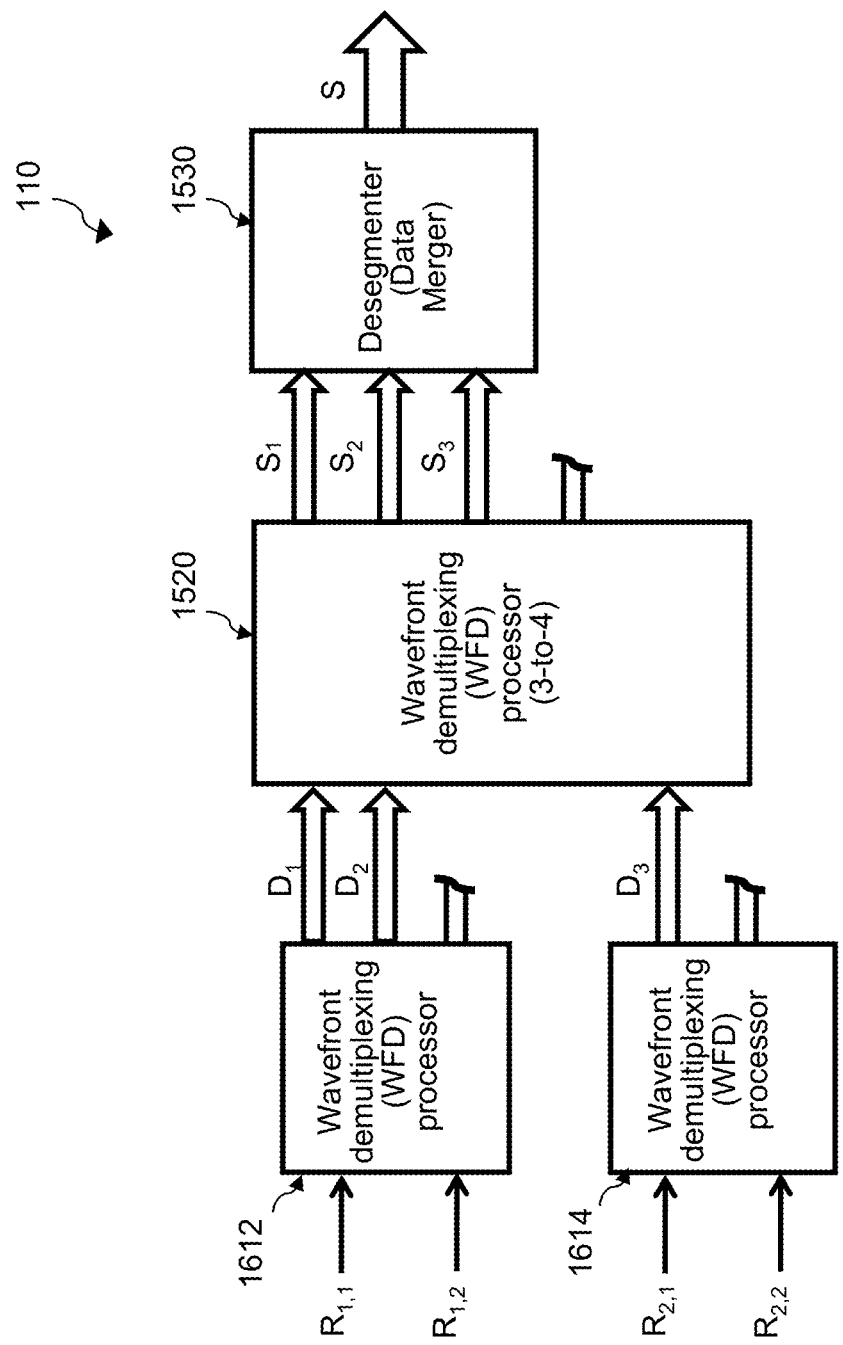
FIG. 16 is a diagram illustrating a data transport and/or storage processing system for receiving or reading data using a cascaded structure for the WFD processor according to one embodiment.

FIG. 16 is a diagram illustrating the data transport and/or storage processing system 110 for receiving or reading data using a cascaded structure for the WFD processor according to one embodiment. The processing system 110 in FIG. 16 is similar to the processing system 110 in FIG. 15 except the number of output streams in the first level WFD processors. The processing system 110 includes WFD processors 1612 and 1614 in the first level, the WFD processor 1520 in the second level, and the de-segmenter 1530. The WFD processor 1612 operates on the two streams $R_{1,1}$ and $R_{1,2}$ and generates 3 outputs, two of which are $D_1$ and $D_2$; the other output may be unused or may be used for integrity check against possible compromised stored/transported data streams. The WFD processor 1614 operates on the two storage streams $R_{2,1}$ and $R_{2,2}$ and generates 2 outputs, one of which is $D_3$; the other output may be unused or may be used for integrity check against possible compromised stored/transported data streams.

Figure 17:
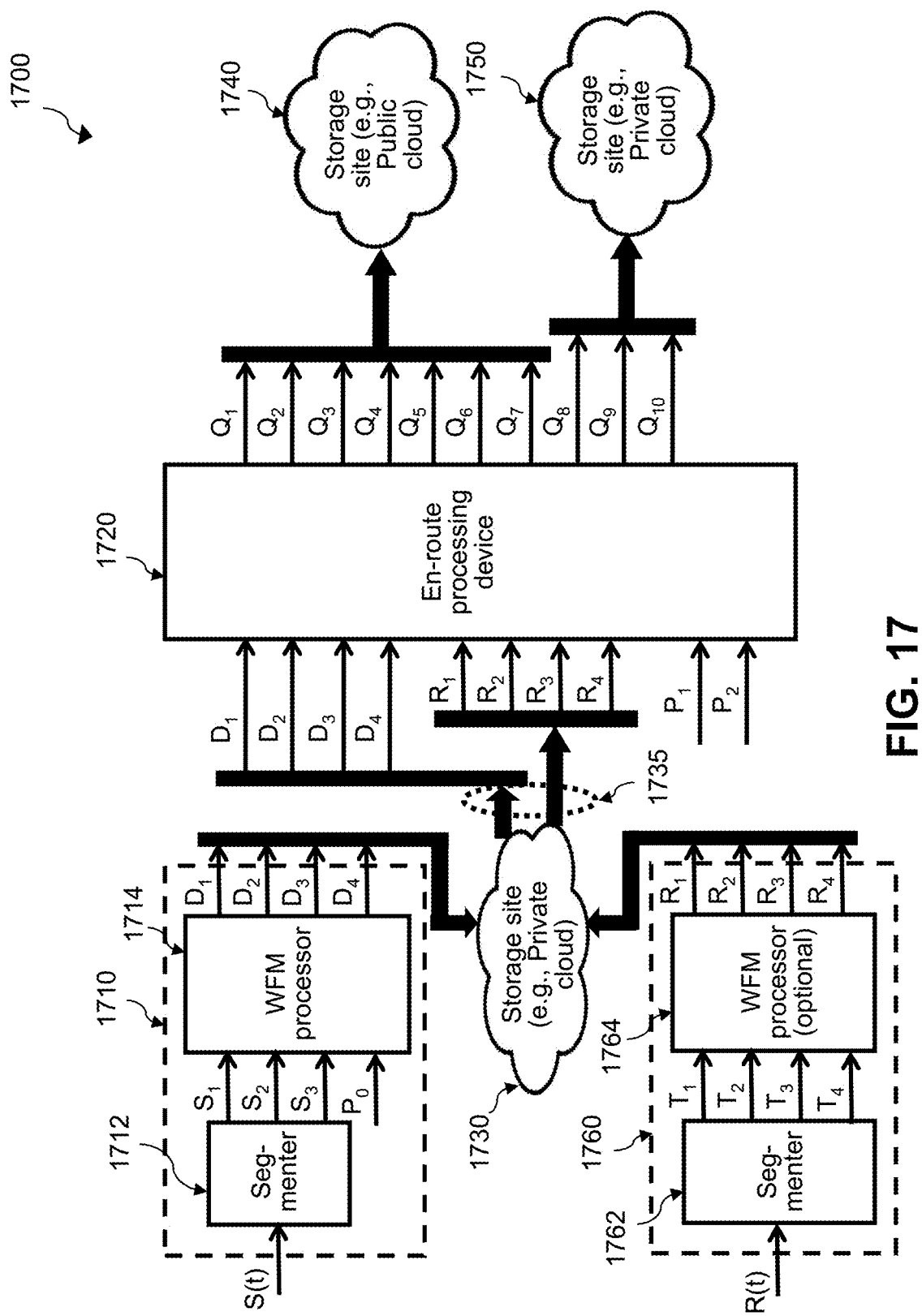
FIG. 17 is a diagram illustrating a data writing system using cascaded K-muxing according to one embodiment.

FIG. 17 is a diagram illustrating a data writing system 1700 using cascaded K-muxing according to one embodiment. The system 1700 includes a first input device 1710, an en-route processing device 1720, and a second input device 1760. The system 1700 exemplifies an operation concept using cascaded K-muxing in writing data streams S(t) and R(t) into distributed storage sites for data privacy and multiple redundancies. The distributed data storage structure includes a first storage site 1730, a second storage site 1740, and a third storage site 1750. The first storage site 1730 may be a local and private cloud. It may have back-channels 1735 for data backup. The back-channels 1735 are typically accessible by cloud operators and network administrators. Regular user devices may not have access to the back-channels. These back channels may comprise of UAV based or satellite based connectivity. The second storage site 1740 may be a remote and public cloud. The third storage site 1750 may be a remote and private cloud. The system 1700 may include more or less than the above elements.

The first input device 1710 may be operated by a first user. It performs a wavefront multiplexing (WFM) transform on a first input stream S(t) and a first probing stream $P_0$ to generate L first intermediate streams. The L first intermediate streams are stored in the first storage site 1730. The first input device 1710 may include a segmenter 1712 and a WFM processor 1714.

The segmenter 1712 segments the first input stream S(t) into L−1 segmented streams. It may be similar to the segmenter 210 in FIG. 2. In the exemplary embodiment shown in FIG. 17, L=4. As is known by one skilled in the art, L may be any positive integer greater than 1. In this exemplary embodiment, the 3 segmented streams are $S_1$, $S_2$, and $S_3$. For simplicity, the variable t is dropped from the segmented streams $S_1$, $S_2$, and $S_3$. In one embodiment, the sizes of the L−1 segmented streams are the same and equal to the size of S(t) divided by (L−1). Assuming the size of the first input stream S(t) is 3×. The size of each of the segmented streams $S_1$, $S_2$, and $S_3$ will be 1×.

$P_0$ is a probing stream. It is used to provide data privacy and redundancy. It is very useful for storage operators in monitoring the data quality systematically or synopsis monitoring of S(t) without monitoring S(t) directly at all. $P_0$ may be a known data stream. i.e., its content is known in advance, or may be generated on-line according to a known structure. It may also be a zero data stream, having only zeros.

The WFM processor 1714 performs K muxing operation or a WFM transform on the L inputs including the segmented streams (e.g., $S_1$, $S_2$, and $S_3$) and the probing stream $P_0$ to generate the L first intermediate streams. In the exemplary embodiment shown in FIG. 17, L=4. The 4 first intermediate streams are $D_1$, $D_2$, $D_3$, and $D_4$. For simplicity, the variable t may be dropped from the first intermediate streams $D_1$, $D_2$, $D_3$, and $D_4$. The WFM transform may include one of a Hadamard transform, a Fourier transform, a Hartley transform, a matrix operation using a full rank matrix, and a matrix operation using an orthogonal matrix.

As an illustration, suppose the WFM transform includes a 4-to-4 Hadamard matrix. The WFM transform generates the 4 first intermediate streams as follows:

$$D_1(t)=S_1(t)+S_2(t)+S_3(t)+P_0 \quad (8a)$$

$$D_2(t)=S_1(t)-S_2(t)+S_3(t)-P_0 \quad (8b)$$

$$D_3(t)=S_1(t)+S_2(t)-S_3(t)-P_0 \quad (8c)$$

$$D_4(t)=S_1(t)-S_2(t)-S_3(t)+P_0 \quad (8d)$$

$D_1(t)$ is a first linear combination of $[S_1, S_2, S_3, P_0]$, and $D_2(t)$ is a second linear combination, and so on. The weight coefficients in the 4 linear combinations are components of a 4×4 Hadamard matrix. Furthermore, equations (8a)-(8d) may be re-written as follows:

$$D_1(t)-P_0=S_1(t)+S_2(t)+S3(t) \quad (9a)$$

$$D_2(t)+P_0=S_1(t)-S_2(t)+S_3(t) \quad (9b)$$

$$D_3(t)+P_0=S_1(t)+S_2(t)-S_3(t) \quad (9c)$$

$$D_4(t)-P_0=S_1(t)-S_2(t)-S_3(t) \quad (9d)$$

The input substreams $S_1(t)$, $S_2(t)$, and $S_3(t)$ are organized and grouped by a first 4-dimensional data structure. $D_1(t)$, $D_2(t)$, $D_3(t)$, and $D_4(t)$ are the corresponding components of the 4 dimensions in the first data structure. With 4 outputs as the structured data streams, or K-muxed data streams, to represent 3 input data substreams, there is a built-in redundancy in the 4 to be stored outputs, $D_1(t)$, $D_2(t)$ $D_3(t)$, and $D_4(t)$. These outputs, with the size of 1× each, are stored in the first storage site 1730 or equivalent local storages.

The operator of the system may have access to $D_1(t)$, $D_2(t)$, $D_3(t)$ and $D_4(t)$ individually. A recovery device may be customized to perform only the following operation or, its equivalent according to equations (8a)-(8d):

$$P_0(t)=\{D_1(t)-D_2(t)-D_3(t)+D_4(t)\}/4 \quad (10)$$

Since various linear combinations of $P_0$ and $S_1$, $S_2$, and $S_3$ may be stored in 4 different storage sites, any contaminations on the stored data in one of the 4 storage sites would impact the recovered $P_0$ as well as $S_1$, $S_2$, and $S_3$. By reading the $P_0$ only in a recovering process, it may be possible to evaluate whether the stored data substreams of $S_1$, $S_2$, and $S_3$ are in good quality.

The second input device 1760 may be used to process another input data stream different than the first input stream S(t). It may be operated by a second user. The second user may be the same or different than the first user. This second input stream R(t) may have a size of 4×. The second input device 1760 may generate Q second intermediate streams from the second input stream R(t) independently of the first input device 1710. Q is a positive integer greater than 1. In the exemplary embodiment shown in FIG. 17, Q=4. The second input device 1760 may include a segmenter 1762, or a segmenter 1762 and a WFM processor 1764. The WFM processor 1764 performs a WFM transform that may include at least one of a Hadamard transform, a Fourier transform, a Hartley transform, a matrix operation using a full rank matrix, and a matrix operation using an orthogonal matrix. When the WFM processor 1764 is not used, the segmenter 1762 segments the second input stream R(t) into 4 substreams, referred to as second intermediate streams, $R_1(t)$, $R_2(t)$, $R_3(t)$, and $R_4(t)$, each with a size of 1×. When the WFM processor 1764 is used, the segmenter 1762 segments the second input stream R(t) into 4 substreams $T_1(t)$, $T_2(t)$, $T_3(t)$, and $T_4(t)$, each with a size of 1×. These 4 substreams $T_1$, $T_2$, $T_3$, and $T_4$ become the inputs to the WFM processor 1764. The WFM processor 1764 performs a WFM transform on the 4 inputs $T_1$, $T_2$, $T_3$, and $T_4$ to generate the 4 substreams, referred to as second intermediate streams, $R_1(t)$, $R_2(t)$, $R_3(t)$, and $R_4(t)$, each with a size of 1×. There is no built-in redundancy in the 4 second intermediate streams $R_1(t)$, $R_2(t)$, $R_3(t)$, and $R_4(t)$. Since R(t) is represented by 4 of its segments, R(t) may also be represented in a second 4-dimensional data structure. $R_1(t)$, $R_2(t)$, $R_3(t)$, and $R_4(t)$ are the corresponding components of the 4 dimensions in the second data structure. But there is no redundancy in this second data structure because a probing stream is not used. The Q second intermediate streams, with the size of 1× each, are stored in the same first storage site 1730 or equivalent local storages.

The second input device 1760 may be configured in a similar manner as the first input device 1710 to provide both data privacy and redundancy. In this configuration, a probing stream may be used as a fourth input to the WFM processor 1764. The second input stream R(t) may have a size of 3× and is segmented into three segmented streams $T_1$, $T_2$, and $T_3$, each with a size of 1×, as in the first input device 1710.

The operations of the first and the second input devices 1710 and 1760 are completely independent, and rarely concurrent. The first storage site 1730 services both the first and the second users locally. It may also be available for remote access through foreground channels. Furthermore, the first storage site 1730, or its equivalent may have back-channels 1735 for data backup.

A transform via en-route processing device 1720 shall be on the back-channels 1735; which are accessible by cloud operators and network administers. Regular user devices may not have access to the back-channels. These back channels may comprise UAV based or satellite based connectivity.

The en-route processing device 1720 generates J output streams from the L first intermediate streams (e.g., $D_1$, $D_2$, $D_3$, and $D_4$) stored in the first storage site 1730 and at least a second probing stream. In the exemplary embodiment in FIG. 17, two second probing streams $P_1$ and $P_2$ are used. When the second input device 1760 is used, The en-route processing device 1720 generates J output streams from the L first intermediate streams (e.g., $D_1$, $D_2$, $D_3$, and $D_4$) stored in the first storage site 1730, at least a second probing stream, and the Q second intermediate streams (e.g., $R_1$, $R_2$, $R_3$, and $R_4$) stored in the first storage site 1730.

The en-route processing device 1720 performs a transformation for data redundancy and/or data privacy on the first and second intermediate streams. The transformation may be a K-muxing (a WFM transformation), an erasure coding, and other similar operations that provide data redundancy and/or data privacy. In one embodiment, the transformation is a WFM transformation. The WFM transformation operates on the L first intermediate streams (e.g., $D_1$, $D_2$, $D_3$, and $D_4$), at least a second probing stream, and the Q second intermediate streams (e.g., $R_1$, $R_2$, $R_3$, and $R_4$). If the number of the second probing streams is W, the en-route processing device 1720 generates J output streams where J=L+Q+W. To provide redundancy and/or privacy, at least a probing stream is used; or W is at least equal to 1. Therefore, J>L+Q. In the exemplary embodiment in FIG. 17, the WFM transformation operates on 8 intermediate streams and 2 second probing streams to generate J=10 output streams ($Q_1$, $Q_2$, ..., $Q_{10}$).

In one embodiment, the en-route processing device 1720 is operated by one of cloud storage providers, such as the operator of the first storage site 1730. The en-route processing device 1720 is not accessible directly by devices from either the first user, the second user, or any other regular users to the first storage site 1730. The en-route processing device 1720 is only accessible to the administrator or the operator of the first storage site 1730. Furthermore, the en-route processing device 1720 performs the transformation via the back-channels 1735.

In the exemplary embodiment shown in FIG. 17, the en-route processing device 1720 uses an 8-to-10 K-muxing, or WFM transformation, processor. The WFM transform may include at least one in the following list: a Hadamard transform, a Fourier transform, a Hartley transform, a matrix operation using a full rank matrix, and a matrix operation using an orthogonal matrix. The 8 inputs comprise two groups of data substreams [$D_1$, $D_2$, $D_3$, $D_4$] and [$R_1$, $R_2$, $R_3$, $R_4$] which are replica or copies, respectively, from previously stored data structure components by the first and the second input devices 1710 and 1760. There will be two other built-in inputs. The two second probing streams $P_1$ and $P_2$ are two built-in inputs. They are the additional probing streams or signals where K-muxing is used. A third data structure may appear among the outputs of the 8-to-10 K-muxing transform in the en-route processing device 1720. The outputs include a set of 10 processed data streams. The 10 outputs are $Q_1$, $Q_2$, ..., $Q_{10}$ and are the components of the third data structure with 10 dimensions.

The K-muxing operation or the WFM transformation in the en-route processing device 1720 may be implemented by a 5-to-5 discrete Fourier transform (DFT). The designation of the inputs and outputs may follow any suitable format. Its five complex inputs, in forms of in-phase and quadrature components ([I, Q]) or real and imaginary components, are [$D_1(t)$, $R_1(t)$], [$D_2(t)$, $R_2(t)$], [$D_3(t)$, $R_3(t)$], [$D_4(t)$, $R_4(t)$], and [$P_1(t)$, $P_2(t)$]. Its five complex outputs are [$Q_1(t)$, $Q_2(t)$], [$Q_3(t)$, $Q_4(t)$], [$Q_5(t)$, $Q_6(t)$], [$Q_7(t)$, $Q_8(t)$], and [$Q_9(t)$, $Q_{10}(t)$].

The J output streams are stored in a distributed storage structure having at least a second storage site that stores P of the J output streams, and P is selected to disable a recovery of the first input stream (when only the first input device 1710 is used) or to disable a recovery of the first and second input streams (when the first and second input devices 1710 and 1760 are used) based on the stored P of the J output streams. This may be based on the following characteristic of the WFM transformation. In order to recover or reconstruct any one of the 8 inputs [$D_1$, $D_2$, $D_3$, $D_4$] and [$R_1$, $R_2$, $R_3$, $R_4$], at least 8 of the 10 components of the third data structure $Q_1$, $Q_2$, ..., $Q_{10}$ should be accessible. Therefore, to deny unauthorized access to stored data, or to disable the recovery or reconstruction of the inputs, it is only necessary to store no more than 7 of the 10 output components in selected sites distributed in public sites, and the remaining others in a remote private storage site. In the exemplary embodiment shown in FIG. 17, 7 of the 10 output streams are stored in the second storage site 1740 and the remaining 3 output streams are stored in the third storage site 1750. In one embodiment, the second storage site 1740 stores P of the J output streams where P is selected to be less than the minimum amount of data streams that allow proper recovery or reconstruction of the input streams. The third storage site 1750 stores the (J−P) of the J output streams that are different than the P of the J output streams stored in the second storage site 1740.

The second probing streams $P_1$ and $P_2$ are known data streams, similar to the P0 probing stream. They may not be numerical zero streams but two data streams known a priori. They are inserted in the third data structure for data privacy and redundancy. They are also very useful for storage operators in monitoring the data quality systematically or synopsis monitoring of $D_k(t)$ and $R_j(t)$ without monitoring them directly at all, where k=1 to L and j=1 to Q. Since various linear combinations of $P_1$, $P_2$, [$D_1$, $D_2$, $D_3$, $D_4$] and [$R_1$, $R_2$, $R_3$, $R_4$] may be stored in 10 different storage sites, any contaminations on the stored data in one of the 10 storage sites would impact the recovered $P_1$, $P_2$, [$D_1$, $D_2$, $D_3$, $D_4$] as well as [$R_1$, $R_2$, $R_3$, $R_4$]. By reading the [$P_1$, $P_2$] in a recovering process from the third data structure, and comparing them with the stored [$P_1$, $P_2$], it may be determined whether the stored data substreams of [$D_1$, $D_2$, $D_3$, $D_4$] and [$R_1$, $R_2$, $R_3$, $R_4$] in the third data structure are valid indirectly.

For the data stream S(t) from the first user device there are 3 layers of redundancy backup; (1) a redundancy [D1, D2, D3, D4] in the first private cloud, and Ds are in K-muxed forms with privacy, (2) a duplicated copy stored in distributed remote sites, and (3) 8 in 10 redundancy in distributed remote sites. On the other hand, the data stream R(t) from the second user device there are two layers of redundancy backup; (1) non redundancy [R1, R2, R3, R4] in the first private cloud, and Rs are in segmented forms without privacy, (2) a duplicated copy stored in distributed remote sites, and (3) 8 in 10 redundancy in distributed remote sites.

The exemplary embodiment shown in FIG. 17 uses two input devices and cascading the WFM processor in the input devices (e.g., 1710 or 1760) with the WFM processor in the en-route processing device 1720. Other configurations may be used. For example, more than two input devices, more than one level (or stage) of cascading of the WFM processors, more than 1 or 2 probing streams, etc.

Figure 18:
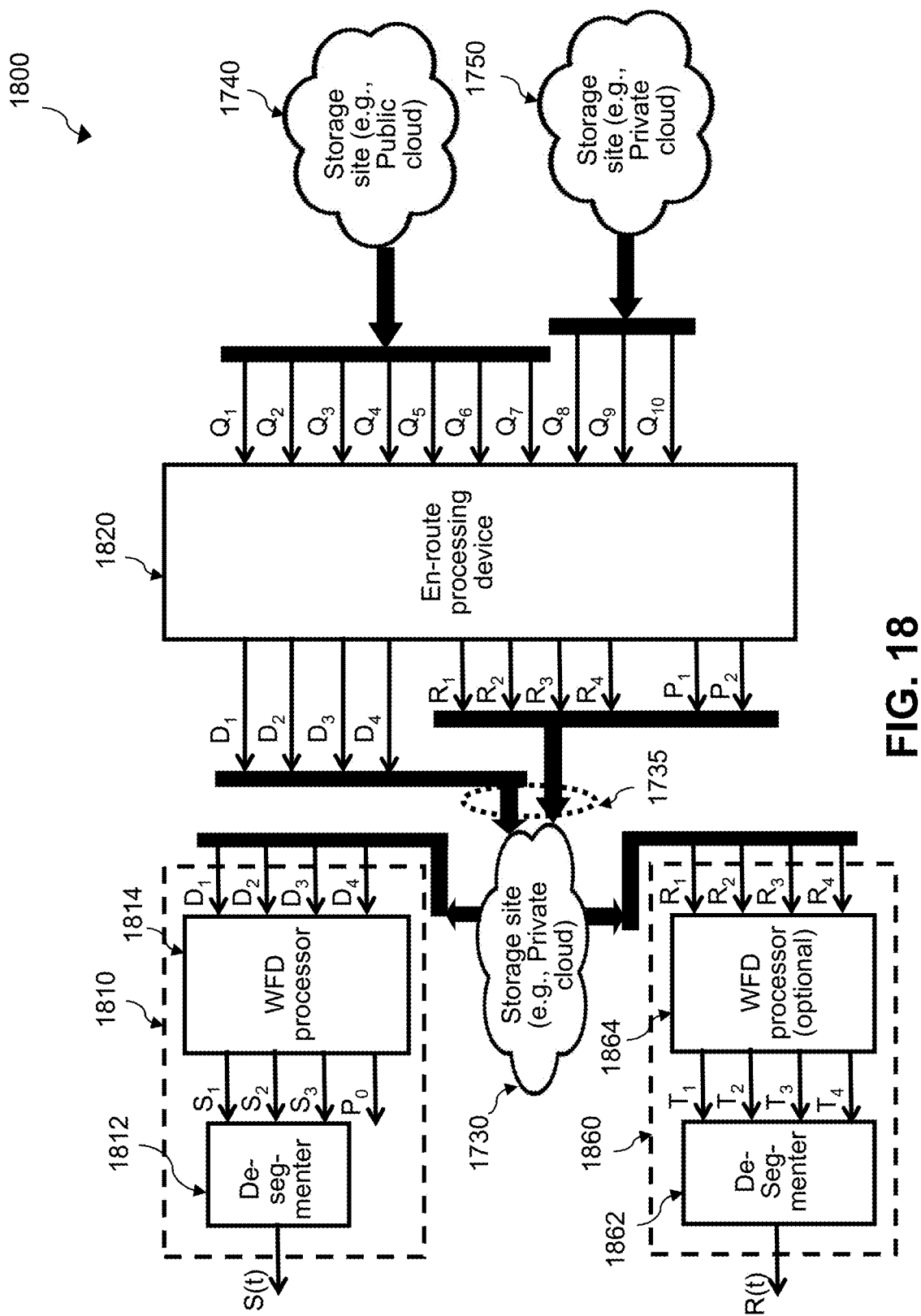
FIG. 18 is a diagram illustrating a data reading system using cascaded K-de-muxing according to one embodiment.

FIG. 18 is a diagram illustrating a data reading system 1800 using cascaded K-de-muxing according to one embodiment. The system 1800 operates in reverse of what the system 1700 operates. Accordingly, many of the operations are similar to the K-demuxing or wavefront de-multiplexing (WFD) transform described in FIGS. 11-16. Components that have the same labels are the same as in FIG. 17 and therefore will not described in detail. The system 1800 includes a first output device 1810, an en-route processing device 1820, and a second output device 1860. The system 1800 exemplifies an operation concept using cascaded K-muxing in reading data streams stored in distributed storage sites to recover or reconstruct the original streams S(t) and R(t) with data privacy and multiple redundancies. The distributed data storage structure includes the first storage site 1730, the second storage site 1740, and the third storage site 1750, as described in FIG. 17.

Assume two output devices 1810 and 1820, S(t) is a first output stream at a 3× size to be recovered by the first output device 1810. R(t) is a second output stream at a 4× size to be recovered by the second output device 1860. The system 1800 may use one or two output devices according to whether the writing mode uses one or two input devices.

In one embodiment, the en-route processing device 1820 is operated by one of cloud storage providers, such as the operator of the first storage site 1730. The en-route processing device 1820 is not accessible directly by devices from either the first user, the second user, or any other regular users to the first storage site 1730. The en-route processing device 1820 is only accessible to the administrator or the operator of the first storage site 1730. Furthermore, the en-route processing device 1820 performs the transformation via the back-channels 1735.

When there is only the first input device 1710 used in data writing, the en-route processing device 1820 generates L first intermediate streams and at least a first recovered probing stream from J input streams including a first stored probing stream. The L first intermediate streams are stored in the first storage site 1730. When there are first and second input devices 1710 and 1760 used in data writing, the en-route processing device 1820 generates the L intermediate streams, the at least first recovered probing stream (e.g., $P_1$, $P_2$), and the Q second intermediate streams from the J streams retrieved from the second and third storage sites 1740 and 1750.

In the exemplary embodiment shown in FIG. 18, the en-route processing device 1820 may use a 10-to-8 K-demuxing, or WFD transform, processor. The WFD transforms may include at least one of a Hadamard inverse transform, a Fourier inverse transform, a Hartley inverse transform, a matrix inversion using a full rank matrix, and a matrix inverse operation using an orthogonal matrix. The 8 outputs include two groups of data substreams [$D_1$, $D_2$, $D_3$, $D_4$] and [$R_1$, $R_2$, $R_3$, $R_4$] which are replica or copies, respectively, from previously stored data structure components by the first and the second input devices. There are two other built-in inputs $P_1$ and $P_2$ as probing data streams in the 10 processed data streams. The $P_1$ and $P_2$ streams are known a priori. The 10 inputs are $Q_1$, $Q_2$, . . . , $Q_{10}$ and are the components of the third data structure with 10 dimensions. In other words, the en-route processing device 1820 generates the L intermediate streams (e.g., $D_1$, $D_2$, $D_3$, and $D_4$), the at least first recovered probing stream (e.g., $P_1$, $P_2$) and the Q second intermediate streams (e.g., $R_1$, $R_2$, $R_3$, and $R_4$) from the J streams retrieved from the second and third storage sites 1740 and 1750.

The outputs of the en-route processing device 1820 are the recovered substreams [$D_1$, $D_2$, $D_3$, $D_4$] and [$R_1$, $R_2$, $R_3$, $R_4$], $P_1$, $P_2$. By examining the output $P_1$ and $P_2$ data stream, it may be possible to determine whether the storages for the data substreams have not been contaminated, and certify that the recovered substreams [$D_1$, $D_2$, $D_3$, $D_4$] and [$R_1$, $R_2$, $R_3$, $R_4$] are valid. As discussed above, the $P_1$ and $P_2$ data streams may be data streams whose contents are known in advance or are two streams of zeros. They are useful for storage operators in monitoring the data quality systematically or synopsis monitoring of $D_k(t)$ and $R_j(t)$ without monitoring them directly at all, where k=1 to L and j=1 to Q. The third data structure does also feature "data integrity monitoring" capability.

In reconstructing any one of the 8 inputs, at least 8 of the 10 components of the third data structure should be accessible or available. Therefore, to deny unauthorized access to stored data or to disable recovery of reconstruction of the original data streams, no more than 7 of the 10 output components may be stored in selected sites distributed in the second storage site 1740, and the remaining others in the third storage site 1750. In other words, the J input streams are retrieved from a distributed storage structure having at least a second storage site that stores P of the J input streams. P is selected to disable a recovery of the first input stream based on the stored P of the J output streams. J, L, and P are positive integers greater than 1, J>L and J>P. The third storage site 1750 may store (J−P) of the J input streams that are different than the stored P of the J input streams.

Since various linear combinations of $P_1$, $P_2$, [$D_1$, $D_2$, $D_3$, $D_4$] and [$R_1$, $R_2$, $R_3$, $R_4$] are stored in 10 different storage sites, any contaminations on the stored data in one of the 10 storage sites would impact the recovered $P_1$, $P_2$, [$D_1$, $D_2$, $D_3$, $D_4$] as well as [$R_1$, $R_2$, $R_3$, $R_4$]. By reading the [$P_1$, $P_2$] in a recovering process from the third data structure, and comparing them with the stored [$P_1$, $P_2$], it may be determined whether the stored data substreams of [$D_1$, $D_2$, $D_3$, $D_4$] and [$R_1$, $R_2$, $R_3$, $R_4$] in the third data structure are valid indirectly.

The first output device 1810 may include a wavefront demultiplexing (WFD) processor 1814 and a de-segmenter 1812. The WFD processor 1814 may perform a WFD transform on the L first intermediate streams to generate the first output stream S(t) via the de-segmenter 1812 and the second recovered probing stream $P_0$.

In the first output device 1810, $D_1(t)$, $D_2(t)$, $D_3(t)$, and $D_4(t)$ are retrieved from the first storage site 1730 or its equivalent with the size of 1× each. They are the 4 stored K-muxed data streams and the corresponding components of the 4 dimensions in the first data structure. They are the inputs to a K-demuxing, or WFD processor, 1814. The outputs of the WFD processor 1814 are the recovered substreams $S_1(t)$, $S_2(t)$, $S_3(t)$ and $P_0$. By examining the output data stream $P_0$, it is possible to determine whether the storages for the K-muxed data substreams have not been contaminated, and certify that the recovered substreams $S_1(t)$, $S_2(t)$, $S_3(t)$ are valid. As described in FIG. 17, the $P_0$ may be a probing stream with known content, or having all zeros.

For example, if the $P_0$ probing stream was zeros when the input stream was written, it is expected the recovered $P_0$ stream is zero. When the recovered $P_0$ data stream contain data other than zeros, it may be concluded that the recovered data substreams $S_1(t)$, $S_2(t)$, and $S_3(t)$ are not valid copies of the original $S_1(t)$, $S_2(t)$, and $S_3(t)$. Only when the recovered $P_0$ stream is a data stream of zeros, it may be concluded that the recovered data substreams are valid copies of the $S_1(t)$, $S_2(t)$, and $S_3(t)$, each with a size of 1×. The final output data stream S(t) in a size of 3× is reconstituted by via an operation of the de-segmenter 1812 from the three recovered substreams $S_1(t)$, $S_2(t)$, and $S_3(t)$.

When the $P_0$ data stream is not a zero stream but a known a priori data stream, by reading the $P_0$ only in a recovering process and comparing with the known pattern or stream, it is possible to determine whether the stored data substreams of $S_1$, $S_2$, and $S_3$ are in good and valid quality indirectly.

In general, the $P_0$ probing stream is inserted in the data structure for data privacy and redundancy. It is very useful for storage operators in monitoring the data quality systematically or synopsis monitoring of S(t) without monitoring S(t) directly at all. This feature may be referred to as "remote integrity check" or "integrity monitoring." Since various linear combinations of $P_0$, and $S_1$, $S_2$, and $S_3$ are stored in 4 different storage sites, any contaminations on the stored data in one of the 4 storage sites would impact the recovered $P_0$ as well as $S_1$, $S_2$, and $S_3$. Thanks to the built-in redundancy in the first data structure, there is a way to build a integrity monitoring capability in the first data structure.

The second output device 1860 has a structure corresponding to the structure of the second input device 1760. In other words, if the second input device 1760 has only a segmenter 1762, then the second output device 1860 has only the de-segmenter 1862. If the second input device 1760 has the segmenter 1762 followed by the WFM processor 1764, then the second output device 1860 has a WFD processor 1864 followed by the de-segmenter 1862. In a similar fashion as in the second input device 1760, the output data stream R(t) in a size of 4× is reconstituted by de-segmenting the streams $R_1(t)$, $R_2(t)$, $R_3(t)$, and $R_4(t)$, each with a size of 1×. Because no probing stream is used in the second output device 1860, there is no built-in redundancy in the 4 stored segmented data substreams, $R_1(t)$, $R_2(t)$, $R_3(t)$, and $R_4(t)$ in a second 4-dimensional data structure. R1(t), R2(t), R3(t), and R4(t) are the corresponding components of the 4 dimensions in the second data structure. Since there are no redundancy in the second data structure, there is no integrity check in the second data structure. The integrity check to the data substreams $R_1(t)$, $R_2(t)$, $R_3(t)$, and $R_4(t)$ on the second data structure may come through the backchannels 1735 via systematic monitoring or synopsis monitoring.

Accordingly, the second input device 1860 generates a second output stream R(t) independently of the first input device 1810 from Q second intermediate streams (e.g., $R_1$, $R_2$, R3, $R_4$). The Q second intermediate streams are stored in the first storage site 1730.

The operations of the first and the second output devices 1810 and 1860 are completely independent, and rarely concurrent. As in the system 1700, the first storage site 1730 services both the first and the second users of the first and the second output devices 1810 and 1860, respectively. It may also be available for remote access through foreground channels. Furthermore, the first storage site 1730, or its equivalent, may have back-channels 1735 for data backup.

The system 1800 may be modified to accommodate various configurations. For example, there may be more than 2 users generating many sets of substreams, the en-route processing device 1820 may feature many transforming devices, each interconnecting various substreams in different sets to form multiple data structures. The components of the data structures are then stored on the selected storage sites, including the second and third storage sites 1740 and 1750. In addition, the number of stages or levels of cascading the WFD processor may be increased.

Figure 19:
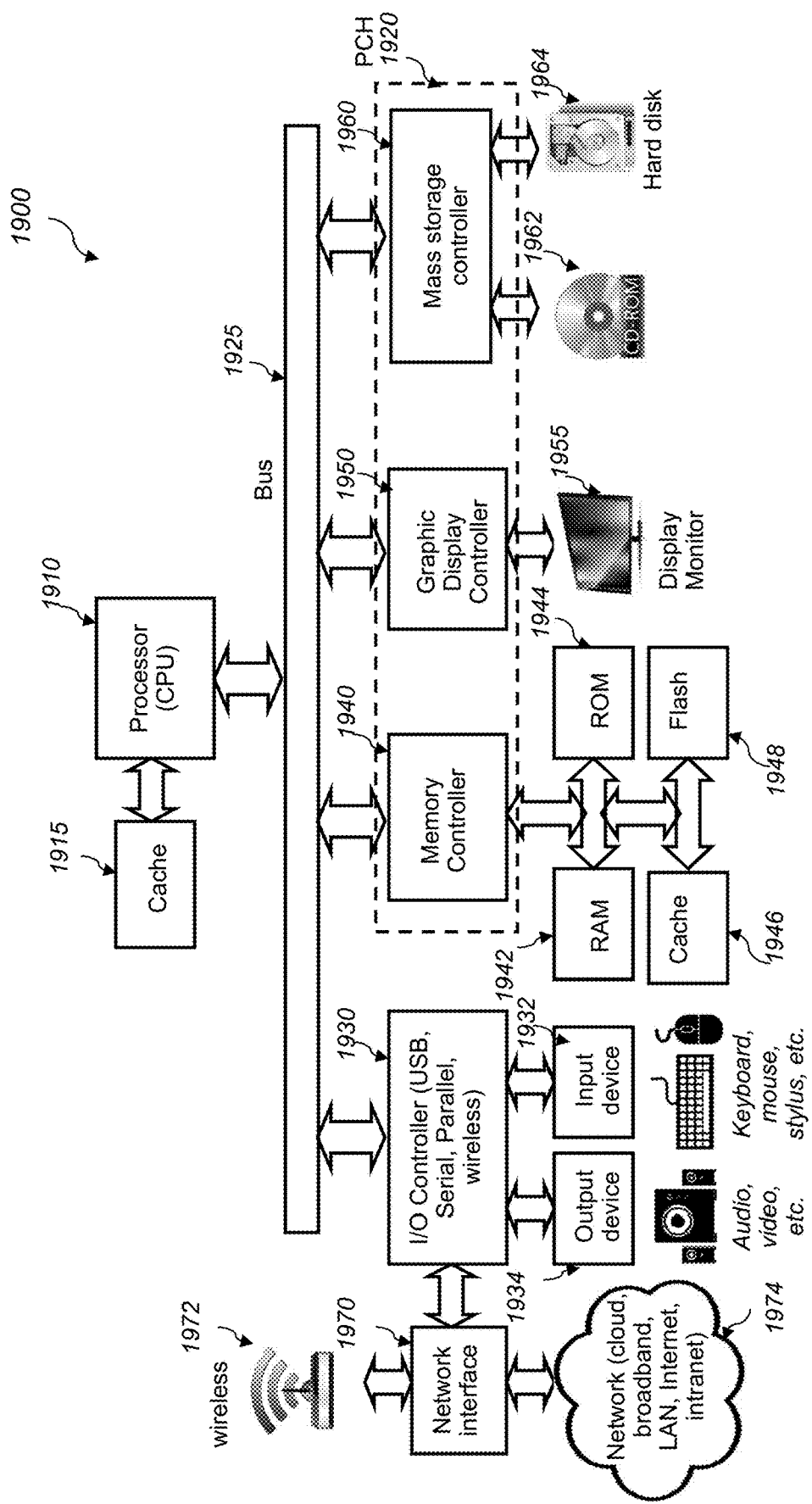
FIG. 19 is a diagram illustrating a WF processor according to one embodiment.

FIG. 19 is a diagram illustrating a WF processor 1900 according to one embodiment. The processing system 1900 shown in FIG. 19 may represent the processing system 110, or the individual processors within the processing system 110, the system 1700 or its individual processors (e.g., 1710, 1720, or 1760), or the system 1800 or its individual processors (e.g., 1810, 1820, or 1860). Not all of the components in FIG. 19 are present for a particular processor. For brevity, the following refers to the processing system 1900, but it is noted that the architecture of the processing system 1900 may change depending on the particular function.

The processing system 1900 includes a central processing unit (CPU) or a processor 1910, a cache 1915, a platform controller hub (PCH) 1920, a bus 1925. The PCH 1920 may include an input/output (I/O) controller 1930, a memory controller 1940, a graphic display controller (GDC) 1950, and a mass storage controller 1960. The system 1900 may include more or less than the above components. In addition, a component may be integrated into another component. As shown in FIG. 19, all the controllers 1930, 1940, 1950, and 1960 are integrated in the PCH 1920. The integration may be partial and/or overlapped. For example, the GDC 1950 may be integrated into the CPU 1910, the I/O controller 1930 and the memory controller 1940 may be integrated into one single controller, etc.

The CPU or processor 1910 is a programmable device that may execute a program or a collection of instructions to carry out a task. It may be a general-purpose processor, a digital signal processor, a microcontroller, or a specially designed processor such as one design from Applications Specific Integrated Circuit (ASIC). It may include a single core or multiple cores. Each core may have multi-way multi-threading. The CPU 1910 may have simultaneous multithreading feature to further exploit the parallelism due to multiple threads across the multiple cores. In addition, the CPU 1910 may have internal caches at multiple levels.

The cache 1915 is a first level (L1) external cache memory. It is typically implemented by fast static random access memory (RAM). Other cache levels may appear externally, such as the cache 1946. Some or all cache levels (L1, L2, and L3) may all be integrated inside the CPU 1910.

The bus 1925 may be any suitable bus connecting the CPU 1910 to other devices, including the PCH 1920. For example, the bus 1925 may be a Direct Media Interface (DMI).

The PCH 1920 in a highly integrated chipset that includes many functionalities to provide interface to several devices such as memory devices, input/output devices, storage devices, network devices, etc.

The I/O controller 1930 controls input devices (e.g., stylus, keyboard, and mouse, microphone, image sensor) and output devices (e.g., audio devices, speaker, scanner, printer). It also has interface to a network interface card 1970 which provides interface to a network 1974 and wireless controller 1972. The network interface card (NIC)

1970 transmits and receives the data packets to and from a wired, wireless network 1972 or 1974. The NIC 1970 may have one or more sockets for network cables and the type of socket depends on the type of network it will be used in. The network 1974 may be a LAN, a MAN, a WAN, an intranet, an extranet, or the Internet.

The memory controller 1940 controls memory devices such as the random access memory (RAM) 1942, the read-only memory (ROM) 1944, the cache memory 1946, and the flash memory 1948. The RAM 1942 may store instructions or programs, loaded from a mass storage device, that, when executed by the CPU 1910, cause the CPU 1910 to perform operations as described above, such as WFM operations. It may also store data used in the operations, including the input data stream or the output data stream. The ROM 1944 may include instructions, programs, constants, or data that are maintained whether it is powered or not. This may include the matrix coefficients used in the envelope or de-envelope process, a catalog of the envelopes, boot program, self-test programs, etc. The cache memory 1946 may store cache data at level L2 or L3. The cache memory 1946 is typically implemented by fast static RAM to allow fast access from the CPU 1910. The flash memory 1948 may store programs, instructions, constants, tables, coefficients, envelopes as in the ROM 1944. It may be erased and programmed as necessary.

The GDC 1950 controls the display monitor 1955 and provides graphical operations. It may be integrated inside the CPU 1910. It typically has a graphical user interface (GUI) to allow interactions with a user who may send a command or activate a function.

The mass storage controller 1960 controls the mass storage devices such as CD-ROM 1962 and hard disk 1964.

Additional devices or bus interfaces may be available for interconnections and/or expansion. Some examples may include the Peripheral Component Interconnect Express (PCIe) bus, the Universal Serial Bus (USB), etc.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
a first input device having a first wavefront multiplexing (WFM) processor to perform a first WFM transform on a first input stream and a first probing stream to generate L first intermediate streams, the L first intermediate streams being stored in a first storage site; and
an en-route processing device to generate J output streams from the stored L first intermediate streams and at least a second probing stream,
wherein the J output streams are stored in a distributed storage structure having at least a second storage site that stores P of the J output streams, and
wherein P is selected to disable a recovery of the first input stream based on the stored P of the J output streams, and
wherein J, L, and P are positive integers greater than 1, J>L and J>P.

2. The apparatus of claim 1 wherein the en-route processing device comprises:
a second WFM processor to perform a second WFM transform on the stored L first intermediate streams and the at least second probing stream to generate the J output streams.

3. The apparatus of claim 1 wherein the first storage site is a local and private cloud site.

4. The apparatus of claim 1 wherein the second storage site is a public cloud site.

5. The apparatus of claim 1 wherein the distributed storage structure further comprises a third storage site that stores (J−P) of the J output streams that are different than the stored P of the J output streams.

6. The apparatus of claim 1 further comprising:
a second input device to generate Q second intermediate streams from a second input stream independently of the first input device, the Q second intermediate streams being stored in the first storage site,
wherein the en-route processing device generates the J output streams from the stored L first intermediate streams, the at least second known stream, and the stored Q second intermediate streams, and
wherein Q is a positive integer greater than 1 and J>L+Q.

7. The apparatus of claim 6 wherein the second input device comprises a segmenter that segments the second input stream into the Q second intermediate streams.

8. The apparatus of claim 6 wherein the second input device comprises:
a segmenter that segments the second input stream into Q segmented streams; and
a third WFM processor to perform a third WFM transform on the Q segmented streams to generate the Q second intermediate streams.

9. The apparatus of claim 8 wherein at least one of the first, second, and third WFM transforms includes at least one of a Hadamard transform, a Fourier transform, a Hartley transform, a matrix operation using a full rank matrix, and a matrix operation using an orthogonal matrix.

10. The apparatus of claim 1 wherein the en-route processing device is not directly accessible to a user of the first storage site.

11. An apparatus comprising:
an en-route processing device to generate L first intermediate streams and at least a first recovered probing stream from J input streams including a first stored probing stream, the L first intermediate streams being stored in a first storage site; and
a first output device having a first wavefront demultiplexing (WFD) processor to perform a first WFD transform on the L first intermediate streams to generate a first output stream and a second recovered probing stream,
wherein the J input streams are retrieved from a distributed storage structure having at least a second storage site that stores P of the J input streams,
wherein P is selected to disable a recovery of the first output stream based on the stored P of the J input streams, and
wherein J, L, and P are positive integers greater than 1, J>L and J>P.

12. The apparatus of claim 11 wherein the en-route processing device comprises:
a second WFD processor to perform a second WFD transform on the J input streams to generate the L first intermediate streams and the at least first recovered probing stream.

13. The apparatus of claim 11 wherein the second storage site is a public cloud site.

14. The apparatus of claim 11 wherein the distributed storage structure further comprises a third storage site that stores (J−P) of the J input streams that are different than the stored P of the J input streams.

15. The apparatus of claim 11 further comprising:
a second output device to generate a second output stream independently of the first output device from Q second intermediate streams, the Q second intermediate streams being stored in the first storage site,
wherein the en-route processing device generates the L intermediate streams, the at least first recovered probing stream and the Q second intermediate streams from the J input streams.

16. The apparatus of claim 15 wherein the second output device comprises a de-segmenter that de-segments the Q second intermediate streams into the second output stream.

17. The apparatus of claim 15 wherein the second output device comprises:
a third WFD processor to perform a third WFD transform on the Q second intermediate streams to generated Q transformed streams; and
a de-segmenter that de-segments the Q transformed streams into the second output stream.

18. The apparatus of claim 17 wherein at least one of the first, second, and third WFD transforms includes at least one of a Hadamard inverse transform, a Fourier inverse transform, a Hartley inverse transform, a matrix inversion using a full rank matrix, and a matrix inverse operation using an orthogonal matrix.

19. The apparatus of claim 11 wherein the en-route processing device is not directly accessible to a user of the first storage site.

20. A method comprising:
performing a first wavefront multiplexing (WFM) transform on a first input stream and a first probing stream to generate L first intermediate streams, the L first intermediate streams being stored in a first storage site; and
generating J output streams from the stored L first intermediate streams and at least a second probing stream,
wherein: (1) the J output streams are stored in a distributed storage structure having at least a second storage site that stores P of the J output streams, (2) P is selected to disable a recovery of the first input stream based on the stored P of the J output streams, and (3) J, L, and P are positive integers greater than 1, J>L and J>P.

* * * * *